US010760306B2

(12) United States Patent
Chapman

(10) Patent No.: US 10,760,306 B2
(45) Date of Patent: Sep. 1, 2020

(54) LOCK FOR SECURING A TOOLBOX TO A SUPPORT STRUCTURE

(71) Applicant: INTERNATIONAL TOOL COMPANY LIMITED, Ashby de la Zouch (GB)

(72) Inventor: David Chapman, Coalville (GB)

(73) Assignee: International Tool Company Limited, Leicestershire (GB)

( * ) Notice: Subject to any disclaimer, the term of this patent is extended or adjusted under 35 U.S.C. 154(b) by 333 days.

(21) Appl. No.: 15/125,636

(22) PCT Filed: Mar. 12, 2015

(86) PCT No.: PCT/GB2015/050721

§ 371 (c)(1),
(2) Date: Sep. 13, 2016

(87) PCT Pub. No.: WO2015/136289

PCT Pub. Date: Sep. 17, 2015

(65) Prior Publication Data

US 2017/0002588 A1 Jan. 5, 2017

(30) Foreign Application Priority Data

Mar. 13, 2014 (GB) .................................. 1404515.7

(51) Int. Cl.
*E05B 73/00* (2006.01)
*B62H 3/02* (2006.01)
(Continued)

(52) U.S. Cl.
CPC ............... *E05B 73/00* (2013.01); *B25H 3/02* (2013.01); *E05B 67/38* (2013.01); *E05B 2067/386* (2013.01)

(58) Field of Classification Search
CPC .... E05B 73/00; E05B 67/38; E05B 2067/386; E05B 2063/0039; E05B 65/52; B25H 3/02
(Continued)

(56) References Cited

U.S. PATENT DOCUMENTS 631,665 A * 8/1899 Potter
1,195,331 A * 8/1916 Blake ........................ E05C 5/00 292/67
(Continued)

FOREIGN PATENT DOCUMENTS

DE 2550454 5/1977
DE 3126666 1/1983
(Continued)

OTHER PUBLICATIONS

European Patent Office, Appn: 15711811.8-1019, International Tool Company Limited, Feb. 7, 2019, Communication pursuant to Article 94(3) EPC, one reference cited (U.S. Pat. No. 4,493,268).
(Continued)

*Primary Examiner* — Lloyd A Gall
(74) *Attorney, Agent, or Firm* — Morgan, Lewis & Bockius LLP

(57) ABSTRACT

A lock for securing a toolbox to a support structure, the lock comprising: a first lock portion configured to receive a first part of the toolbox or a first attachment of the toolbox; and a second lock portion configured to engage a second part of the toolbox or a second attachment of the toolbox, the second lock portion being lockable to inhibit or substantially prevent disengagement of the second part or second attachment, wherein: the second lock portion is remote from the first lock portion, the first and second lock portions are securable with respect to a support structure, and the first lock portion is configured to guide movement of the second
(Continued)

part of the toolbox or the second attachment of the toolbox into engagement with the second lock portion.

19 Claims, 22 Drawing Sheets

(51) Int. Cl.
*E05B 63/00* (2006.01)
*E05B 65/52* (2006.01)
*B25H 3/02* (2006.01)
*E05B 67/38* (2006.01)

(58) Field of Classification Search
USPC ..... 109/47, 50–52; 292/67, 69; 70/225–228; 248/551; 224/403, 404; 410/66, 67; 16/35 R; 296/37.6, 65.03, 65.04; 297/336
See application file for complete search history.

(56) References Cited

U.S. PATENT DOCUMENTS 1,284,399 A * 11/1918 McManus ........... E05B 65/0811 292/101
1,361,169 A * 12/1920 Myers ................... E05B 83/243 292/109
1,546,175 A * 7/1925 Lyons ....................... E05C 5/00 292/67
1,592,638 A * 7/1926 Miner ..................... E05F 11/00 292/67
1,731,680 A * 10/1929 Mueller .................. E05F 11/00 292/67
2,679,418 A * 5/1954 Cisco ..................... B61D 17/16 292/256.5
2,795,947 A * 6/1957 Peras ...................... E05B 83/16 292/216
2,915,850 A * 12/1959 Goodfellow ........... A47B 91/12 248/346.11
2,920,914 A * 1/1960 Jenkins ................... E05C 3/047 292/67
2,930,645 A * 3/1960 Dall ........................ E05B 83/16 292/109
2,967,418 A * 1/1961 Donald ................. E05B 63/127 190/28
3,406,998 A * 10/1968 Rutzen ................... B60N 2/345 280/727
3,413,025 A * 11/1968 Sperry ................ E05B 65/0817 292/111
3,618,785 A * 11/1971 Newman ................. E05B 73/00 211/4
3,652,103 A * 3/1972 Higgs ................... B62B 5/0423 280/33.994
3,711,117 A * 1/1973 Penner .................... B60R 25/09 280/762
3,876,076 A * 4/1975 Hazelhurst ............. A01K 97/08 211/4
3,918,278 A * 11/1975 Spear ................... A61G 12/001 70/58
4,249,684 A 2/1981 Miller
4,366,923 A * 1/1983 Koch ..................... B62D 43/08 224/403
4,416,126 A * 11/1983 Remington ............. E05B 37/02 70/312
4,493,268 A 1/1985 Sidler
4,622,833 A * 11/1986 Shepherd ................ B60R 25/09 70/226
4,703,960 A * 11/1987 Lense ................. E05B 47/0012 292/192
4,738,341 A * 4/1988 Asano .................... A45C 13/20 190/101
4,923,230 A * 5/1990 Simpson ............. E05B 65/0852 292/338
5,076,078 A * 12/1991 Weger, Jr. ............... E05B 67/38 292/104
5,174,617 A * 12/1992 Huber ................. E05B 17/2038 292/106
5,390,787 A * 2/1995 Macasaet ........... G11B 33/0433 190/101
5,488,914 A * 2/1996 Ouellette ................ E05G 1/005 109/50
5,870,910 A * 2/1999 Specht .................... E05G 1/005 109/52
5,924,616 A 7/1999 Shives
6,817,637 B1 * 11/2004 Anderson ............. E05B 15/022 292/150
7,117,700 B2 * 10/2006 Smith ................... B60R 25/093 70/225
7,669,443 B2 * 3/2010 Varner .................... E05B 73/00 109/51
8,387,940 B2 * 3/2013 Gros ....................... B63B 29/06 224/42.4
2002/0108410 A1 * 8/2002 Webb ....................... B25H 3/02 70/159
2008/0054035 A1 * 3/2008 Walker .................... B60R 9/048 224/403
2011/0221222 A1 9/2011 Ross
2014/0131964 A1 * 5/2014 Farrelly ................... A45C 5/14 280/79.2
2015/0021132 A1 * 1/2015 Sijmons ................... A45C 5/03 190/120
2015/0313334 A1 * 11/2015 Gadzinski .............. A45C 5/146 190/11

FOREIGN PATENT DOCUMENTS

| | | |
|---|---|---|
| FR | 2545137 | 4/1983 |
| GB | 368507 | 3/1932 |
| GB | 2363422 | 12/2001 |
| WO | 2007060393 | 5/2007 |
| WO | 2008023144 | 2/2008 |

OTHER PUBLICATIONS

Patent Cooperation Treaty; PCT/GB2007/003018; International Search Report, dated Nov. 21, 2007.
GB Intellectual Property Office; GB1404515.7, Search Report under Section 17; dated Jun. 2015.
UK Intellectual Property Office—Examination Report under Section 18(3); GB1404515.7; dated Dec. 20, 2019—citing 5 references.

* cited by examiner

LOCK FOR SECURING A TOOLBOX TO A SUPPORT STRUCTURE

DESCRIPTION OF INVENTION

Embodiments of the present invention relate to a lock for a toolbox or other wheeled objects, a toolbox lock, a toolbox and toolbox lock, and associated methods.

Toolboxes are commonly found in garages and other similar environments in which tools are required. In many instances, these toolboxes are generally in the form of wheeled cabinets which can be wheeled across a floor surface (to a convenient location).

The toolboxes themselves can be expensive. Furthermore, the tools which the toolboxes store can also be expensive. The toolboxes, therefore, represent a tempting target for thieves. Toolboxes which are mounted on wheels are particularly attractive targets for thieves because of the easy of mobility of the toolboxes.

There is, therefore, a need to provide a mechanism to secure a toolbox.

WO2008/023144 discloses a security device which comprises a received mounted to the floor and a pin mounted to the base of a cabinet. With the pin and receiver aligned, the pin can be lowered into the receiver and secured in place with a padlock. The document only discloses cabinets which are supported by legs and which are not, therefore, intended to be moved on a frequent basis. As will be appreciated, this device requires precise alignment of the pin and receiver, with the cabinet supported above the floor surface. Such a device would not be operable to secure a wheeled cabinet, is awkward to use, and requires the cabinet to undergo significant modification to secure the pin thereto.

Embodiments of the invention seek to ameliorate one or more problems associated with the prior art.

An aspect of the present invention provides a lock for securing a toolbox to a support structure, the lock comprising: a first lock portion configured to receive a first part of the toolbox or a first attachment of the toolbox; and a second lock portion configured to engage a second part of the toolbox or a second attachment of the toolbox, the second lock portion being lockable to inhibit or substantially prevent disengagement of the second part or second attachment, wherein: the second lock portion is remote from the first lock portion, the first and second lock portions are securable with respect to a support structure, and the first lock portion is configured to guide movement of the second part of the toolbox or the second attachment of the toolbox into engagement with the second lock portion.

The first lock portion may comprise a body which defines a channel which is configured to receive the first part of the toolbox or first attachment.

The second lock portion may include a hook which is configured to engage the second part of the toolbox or second attachment.

The hook may be moveable between a stowed and an operative condition.

The second lock portion may include a bolt and the hook defines a bolt receiving aperture which is configured to receive at least part of the bolt.

The hook may be rotatable with respect to a main body of the second lock portion.

The hook may be further configured for linear movement with respect to the main body.

The second lock portion may include a resilient biasing arrangement which is configured to bias the hook into an engaging position in which the second part of the toolbox or second attachment is moveable into and/or out of a hook recess.

Movement of the hook against the resilient biasing arrangement may move the hook into a locking position in which the second part of the toolbox or second attachment is inhibited or substantially prevented from leaving the hook recess.

The first and second lock portions may be securable to the support structure.

Another aspect provides a lock for securing a toolbox to a support structure, the lock comprising: a lock portion securable with respect to a support structure; and a lock engagement member, wherein the lock engagement member is configured to be mounted to a ground engaging mechanism of the toolbox and the lock portion is configured to engage the lock engagement member, the lock portion being selectively lockable to inhibit or substantially prevent disengagement of the lock engagement member from the lock portion.

The lock may further include another lock portion securable with respect to the support structure and configured to receive another part of the toolbox or another attachment of the toolbox.

The ground engaging mechanism may be a caster.

The lock engagement member may be mounted to an axle bolt of the ground engaging mechanism.

Another aspect provides a lock for securing a toolbox to a support structure, the lock comprising: a lock portion having a member which is configured to engage a part of a toolbox or an attachment of the toolbox and which is selectively lockable to inhibit or substantially prevent disengagement of the part or attachment of the toolbox, wherein the member of the lock portion is moveable between an operative condition in which the member extends from the support structure a first distance and a stowed condition in which the member extends from the support structure a second distance which is less than the first distance.

The member may be a hook which is rotatable with respect to a main body of the lock portion.

The hook may be configured to resist movement from the stowed condition to the operative condition.

The member may define an aperture configured to receive a pin, wherein the pin extends through a first part of the aperture when the member is in the operative condition and through a second part of the aperture when the member is in the stowed condition.

The member may extend generally vertically when in the stowed condition and generally horizontally when in the operative condition.

The lock may further include a padlock or integral lock.

Another aspect provides a toolbox and toolbox lock combination, wherein the lock is as above.

The toolbox and toolbox lock combination may further include one or more tools.

Embodiments of the invention are described, by way of example only, with reference to the accompanying drawings, in which.

Figure 1:
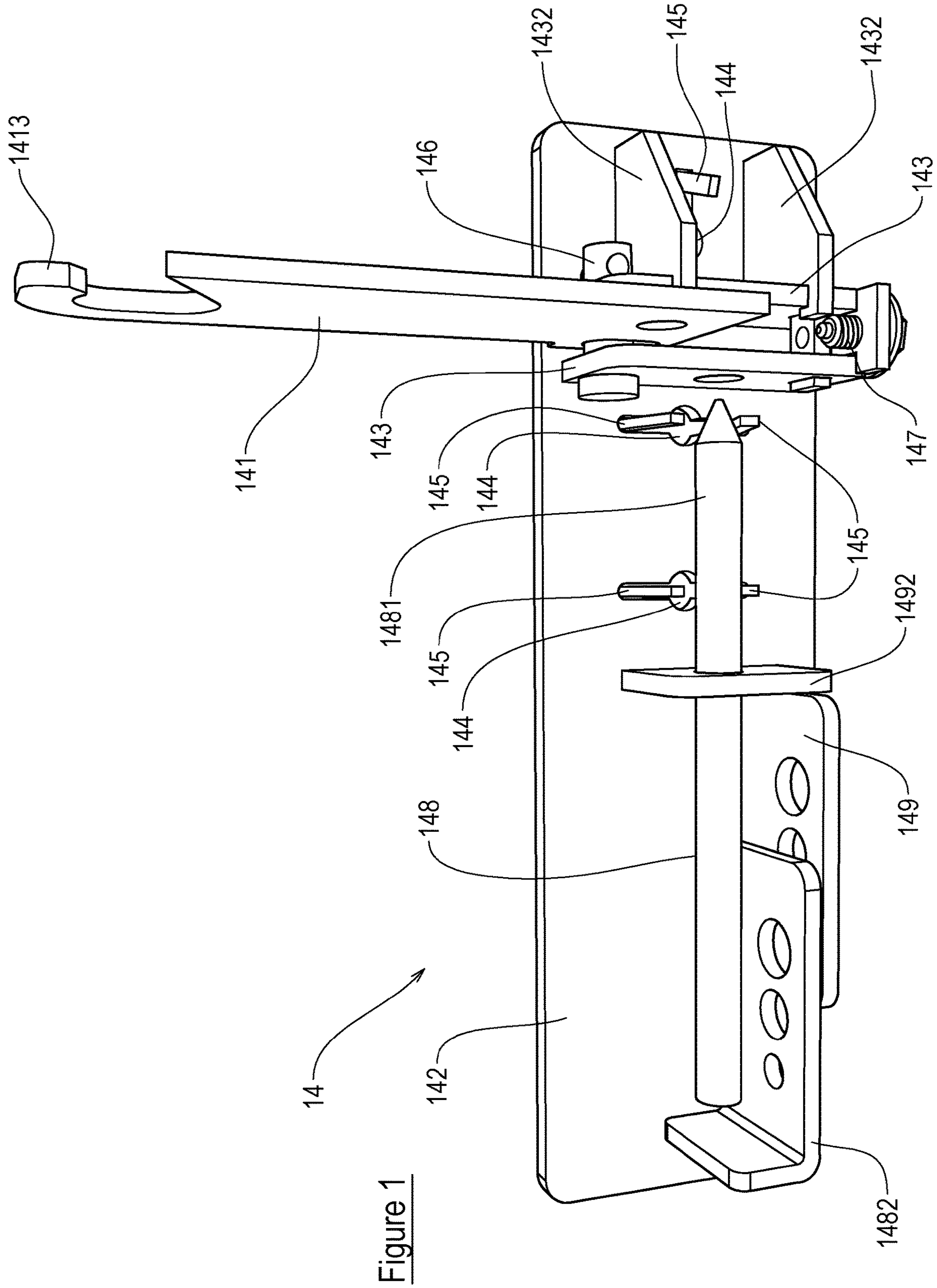
FIG. 1 shows a part of a toolbox lock with the hook in a stowed condition.
Figure 2:
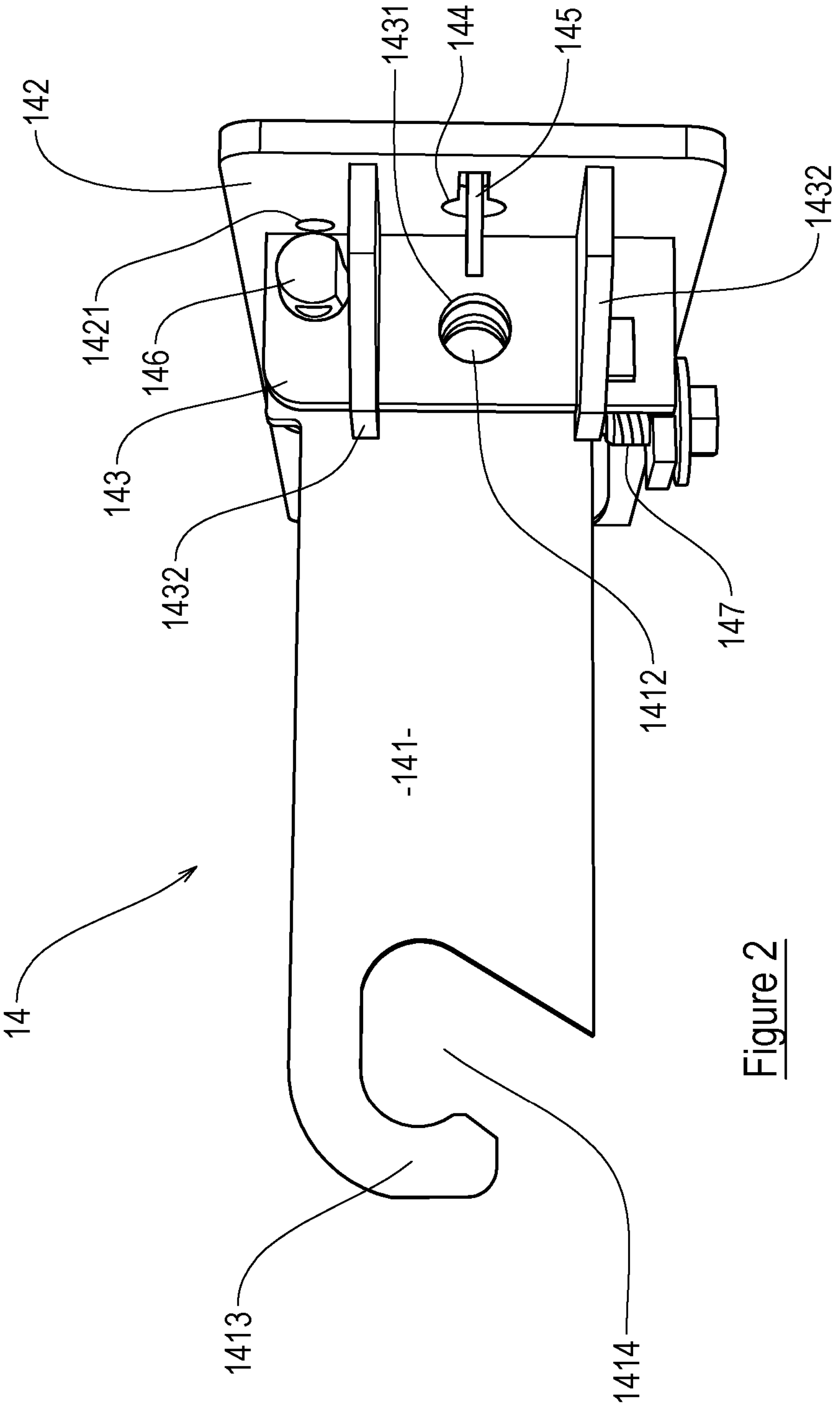
FIG. 2 shows a part of a toolbox lock with the hook in an engaging position of an operative condition.
Figure 3:
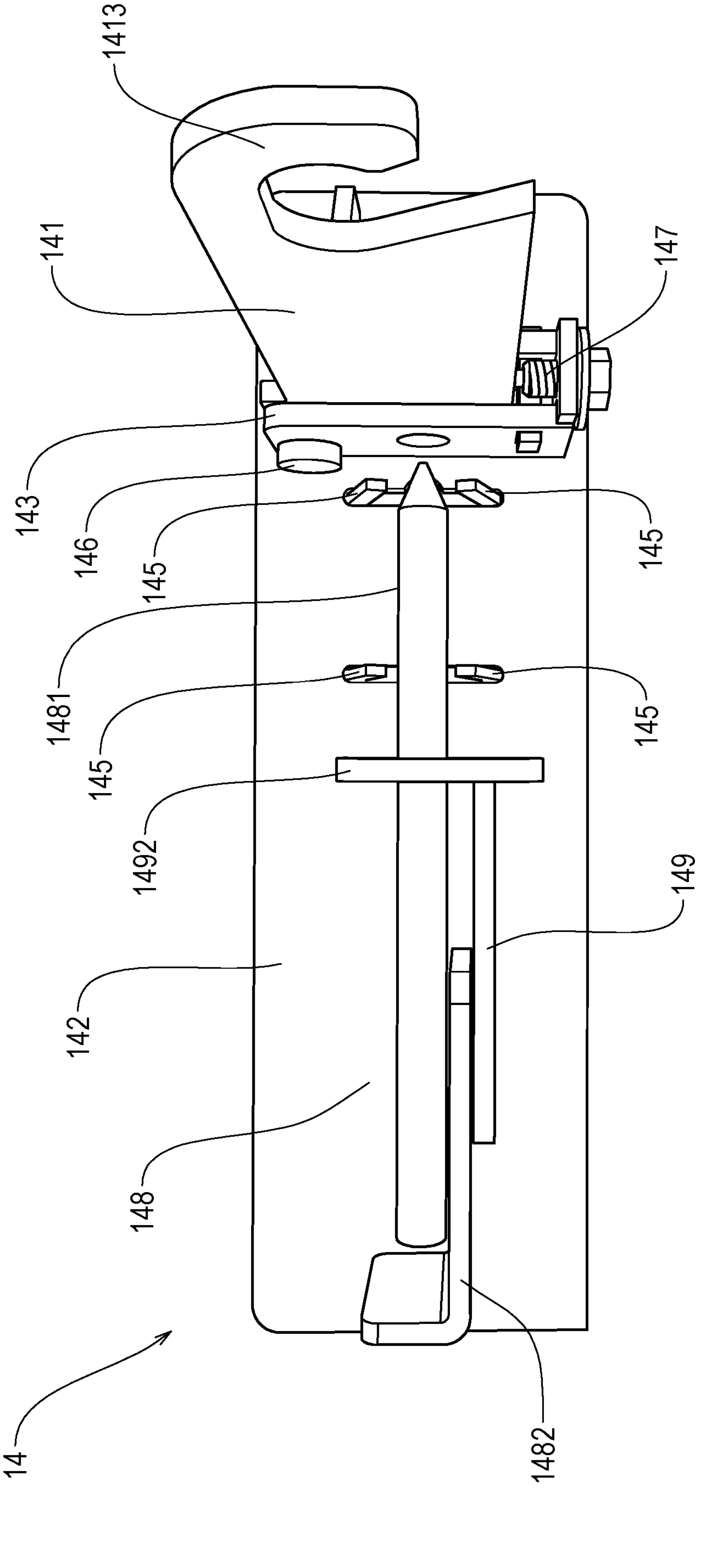
FIG. 3 shows a part of a toolbox lock with the hook in an engaging position of an operative condition and a bolt in an unbolted position.
Figure 4:
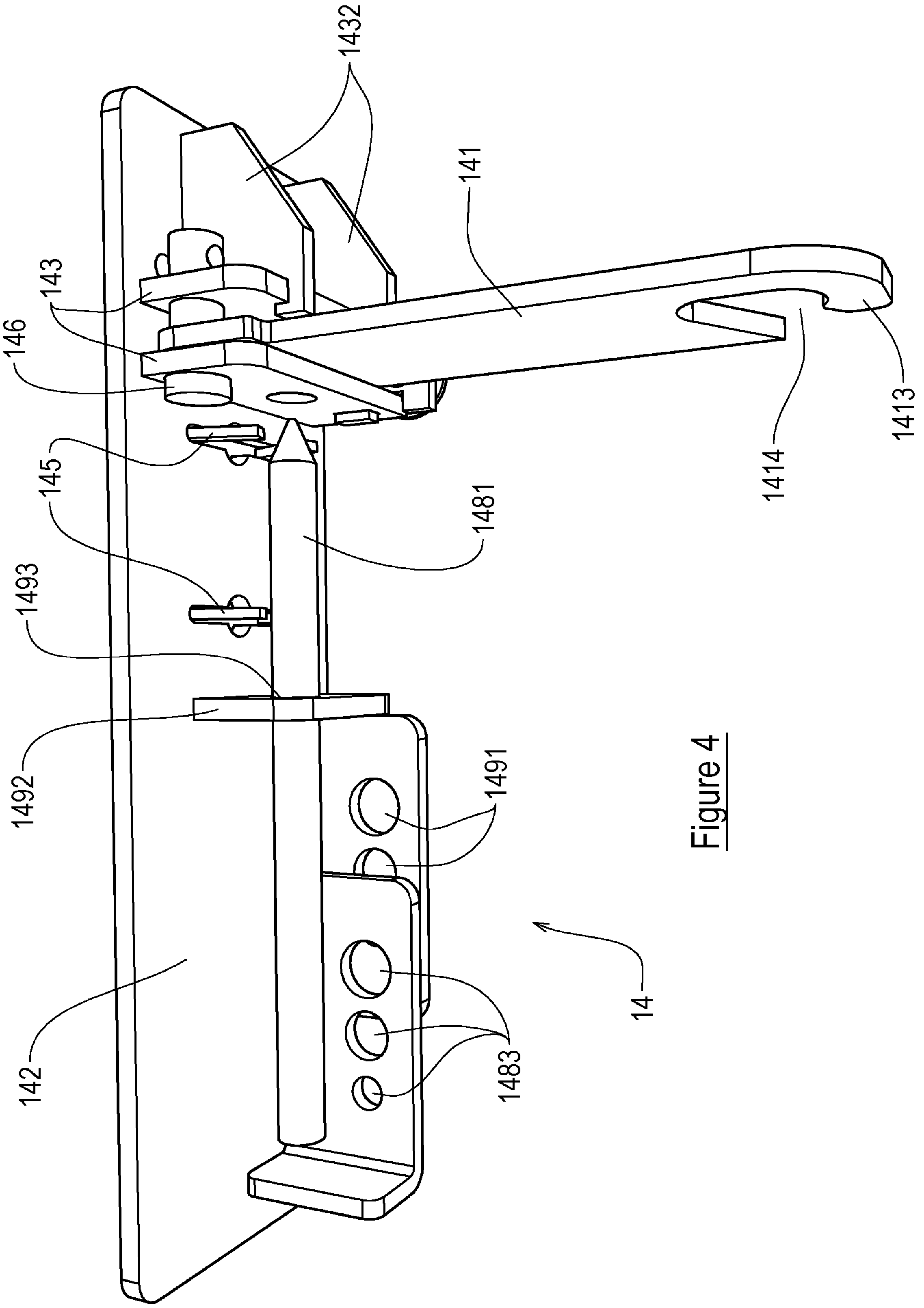
FIG. 4 shows a part of a toolbox lock with the hook in an engaging position of an operative condition and a bolt in an unbolted position.
Figure 5:
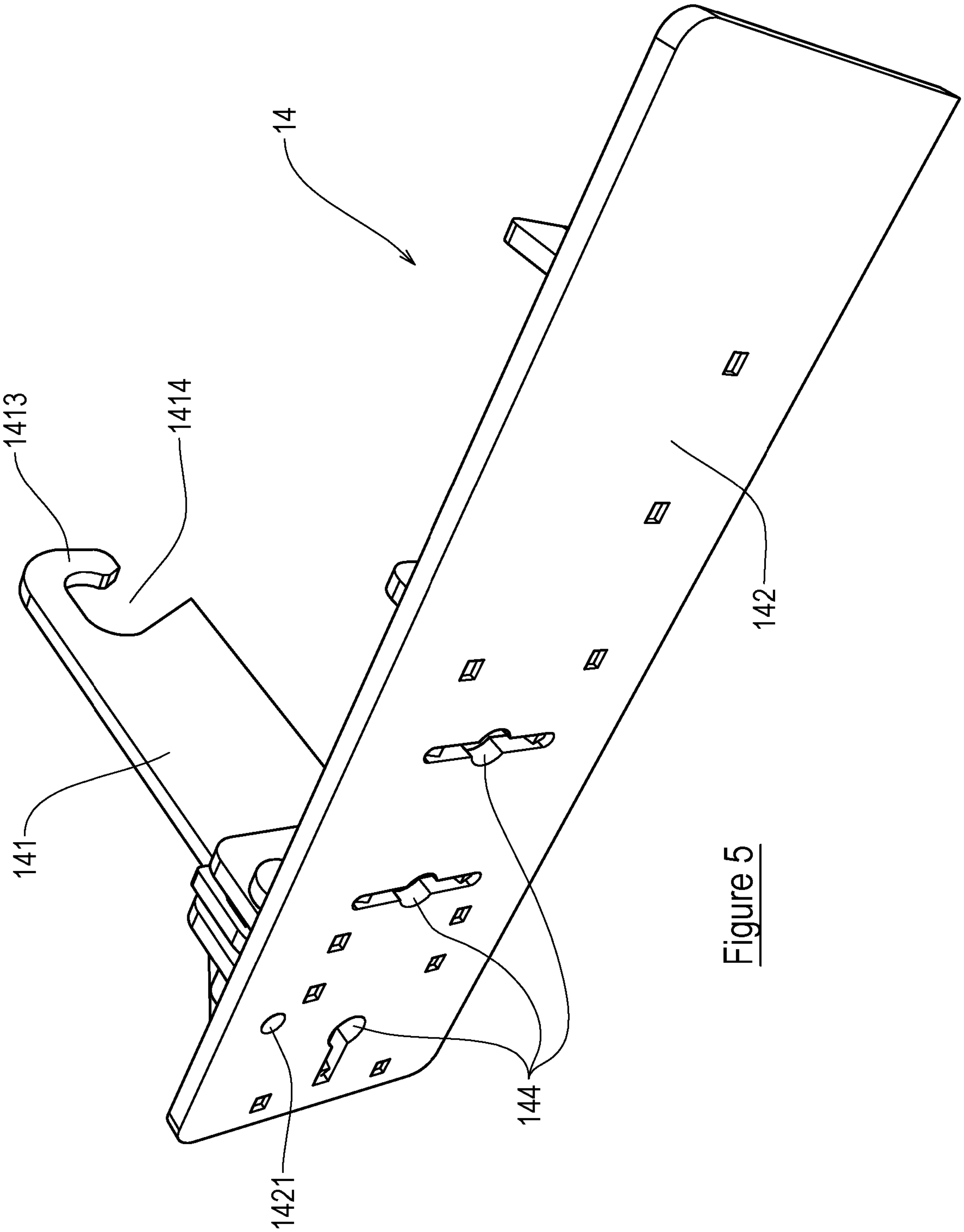
FIG. 5 shows a rear view of a part of a toolbox lock.
Figure 6:
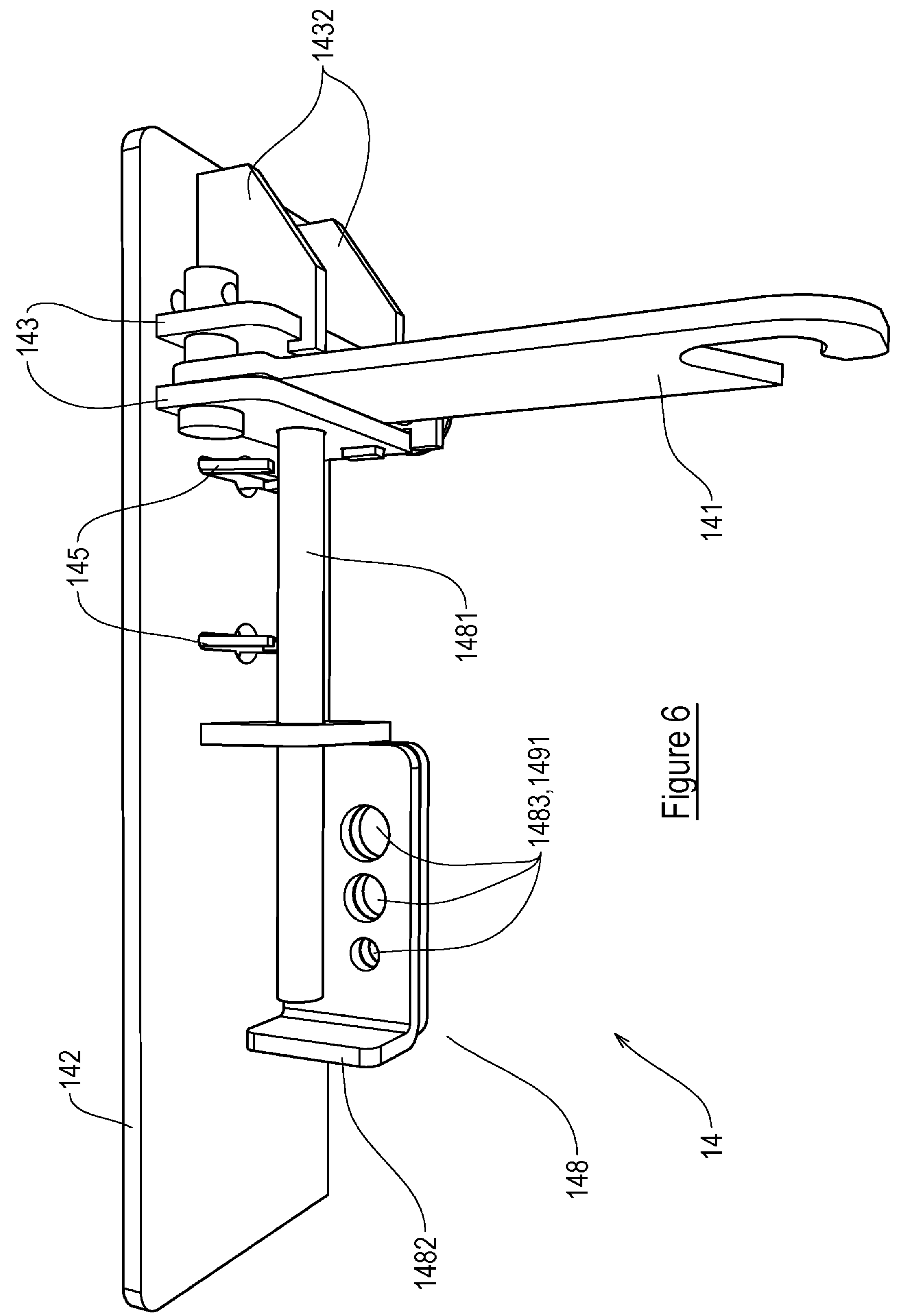
FIG. 6 shows a part of a toolbox lock in a locking position of an operative condition and a bolt in a bolted position.
Figure 7:
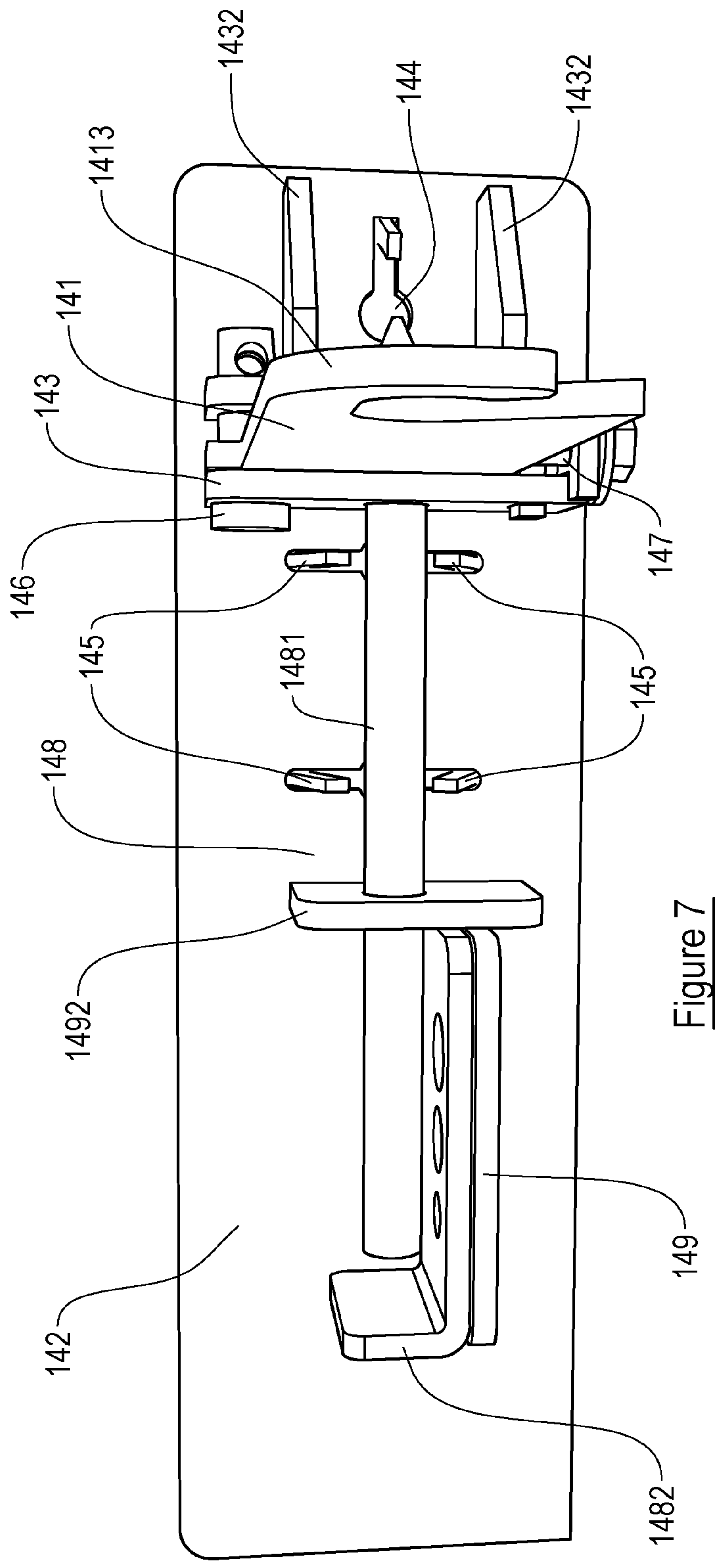
FIG. 7 shows a part of a toolbox lock in a locking position of an operative condition and a bolt in a bolted position.
Figure 8:
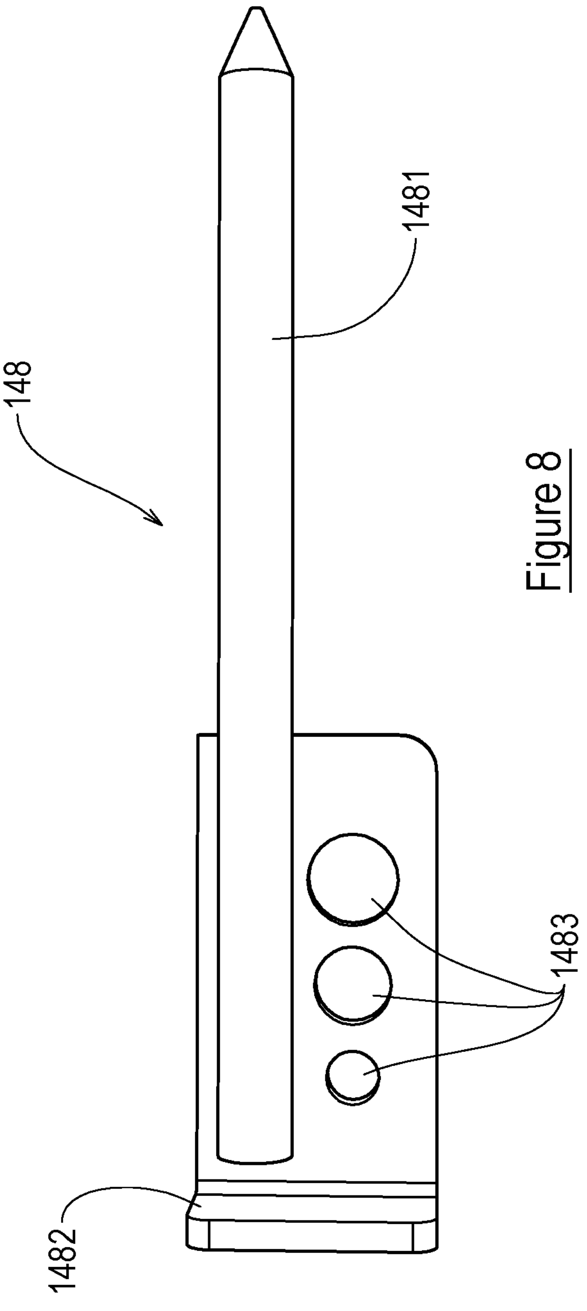
FIGS. 8 and 9 show a bolt.
Figure 9:
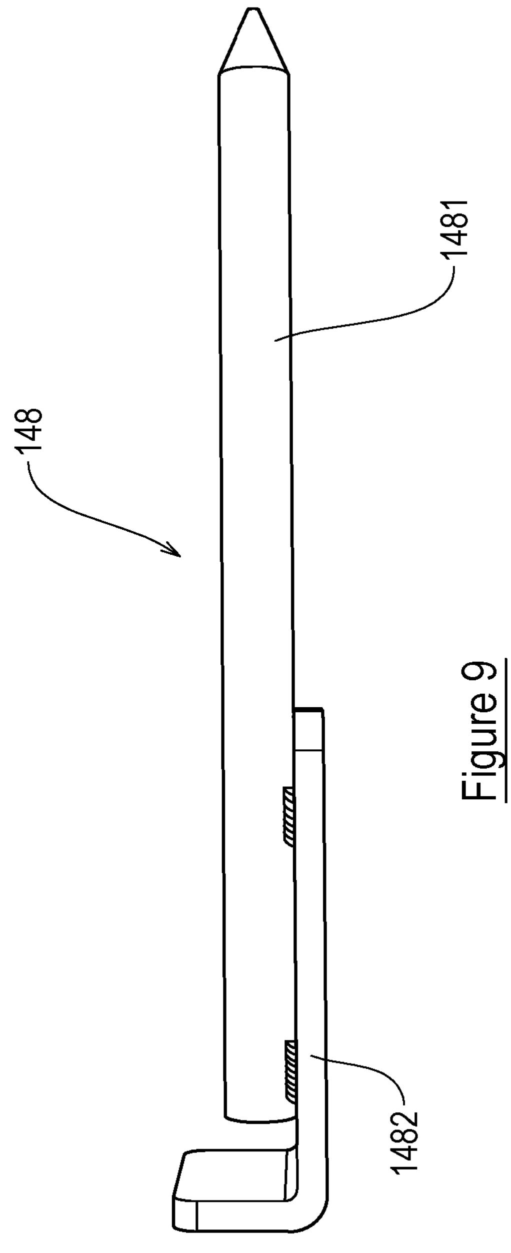
Figure 10:
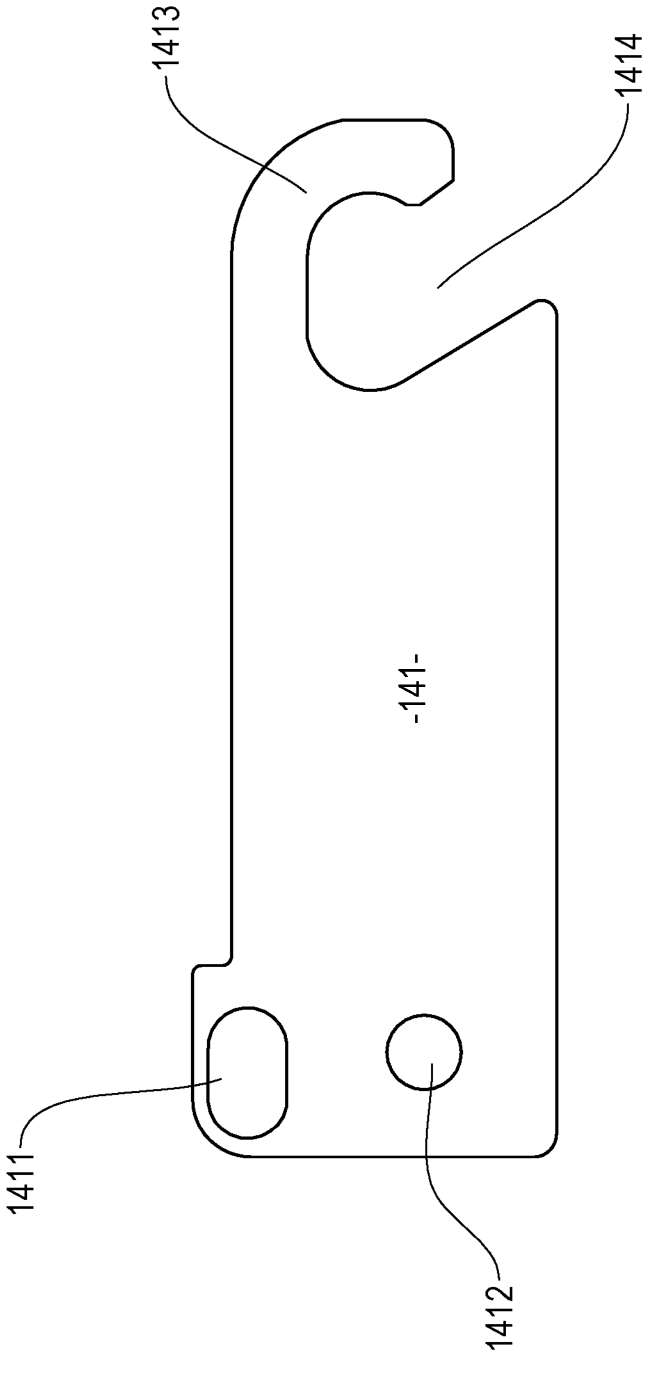
FIG. 10 shows a hook.
Figure 11:
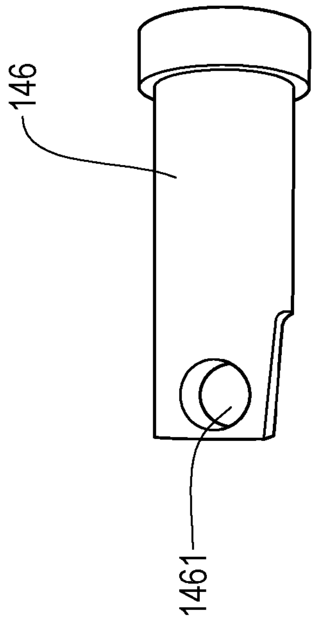
FIGS. 11 and 12 show a pin.
Figure 12:
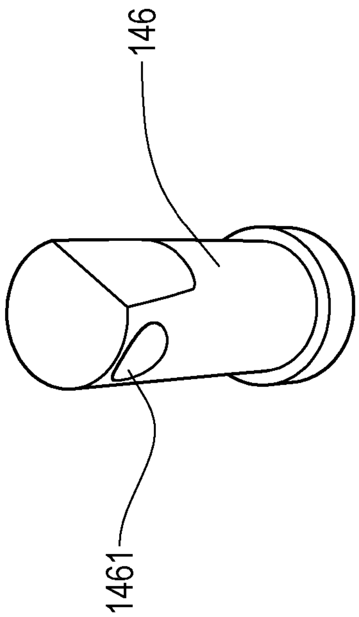
Figure 13:
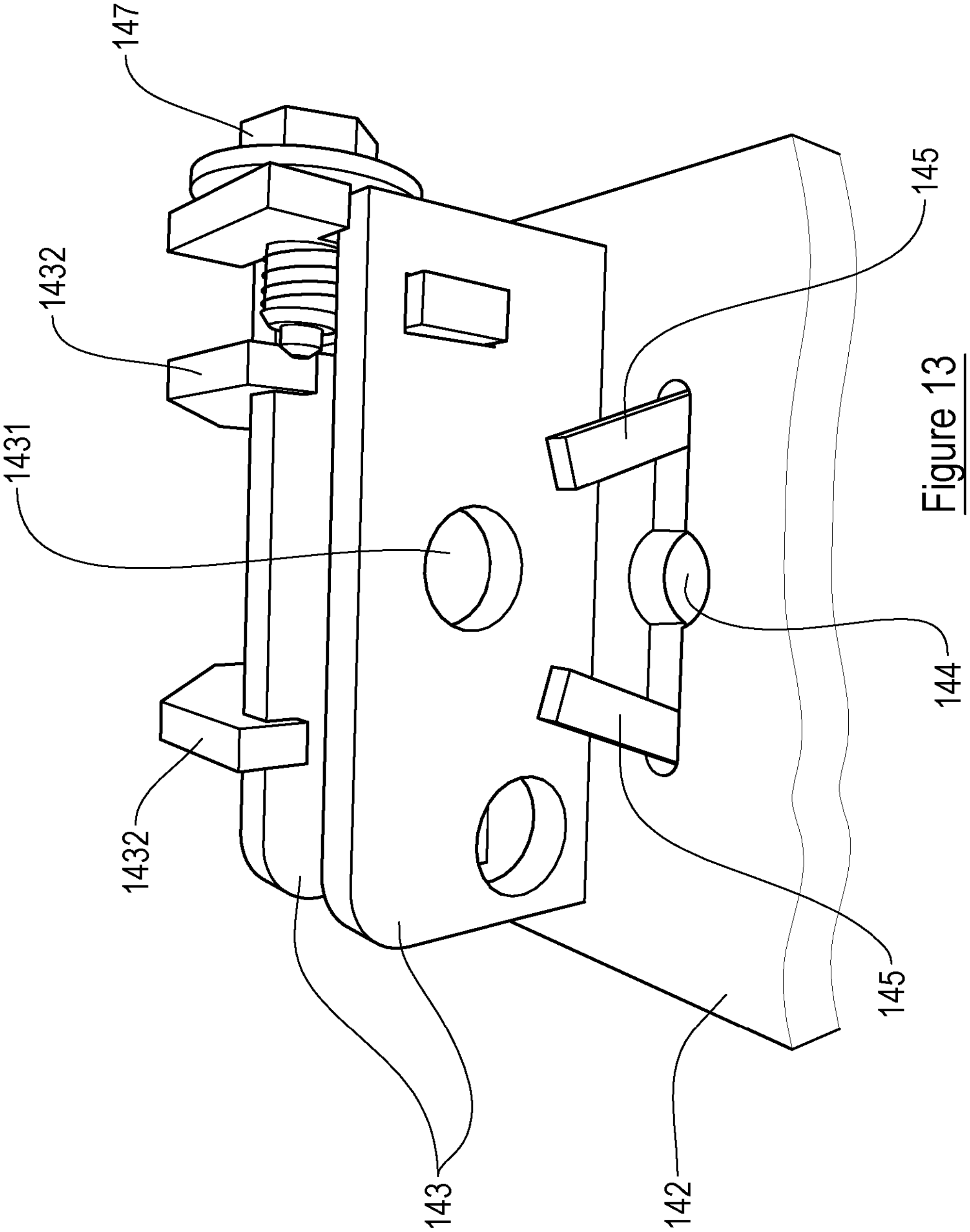
FIGS. 13 to 15 show views of parts of a toolbox lock.
Figure 14:
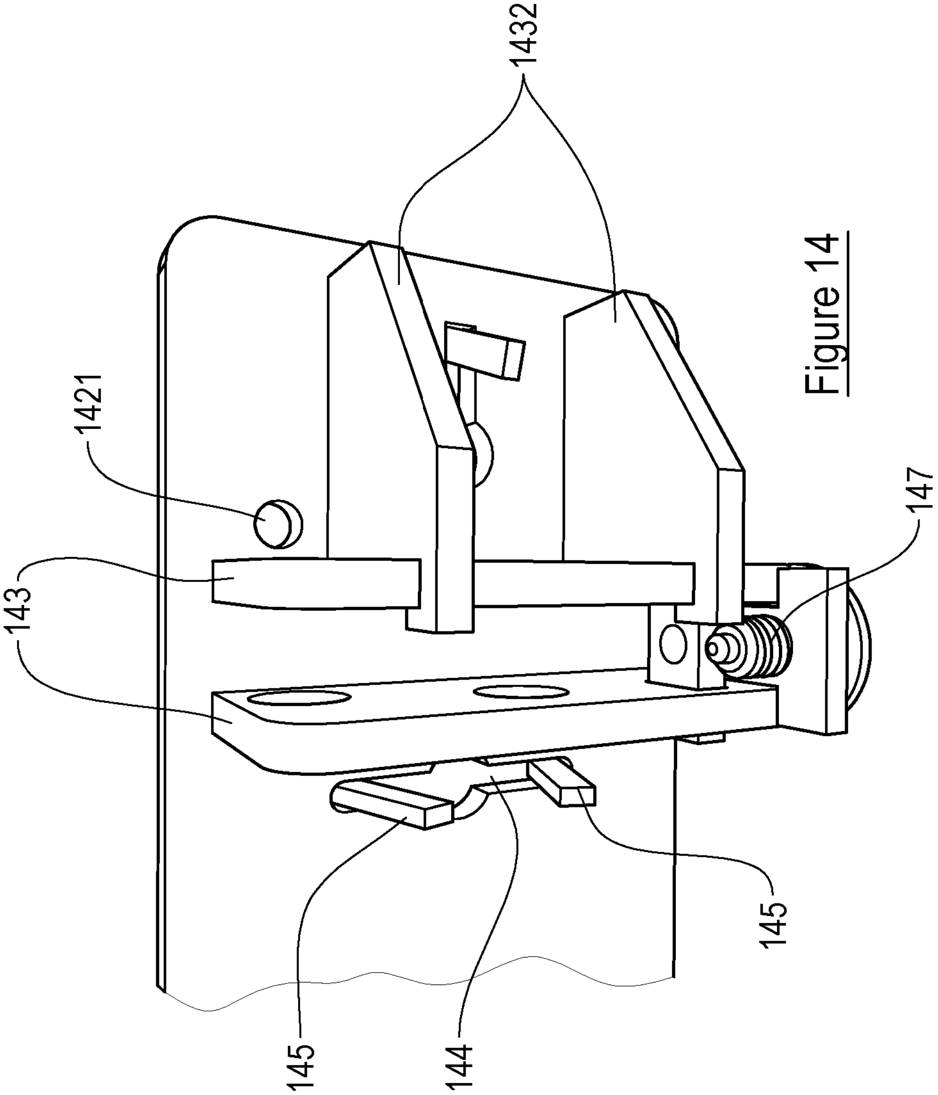
Figure 15:
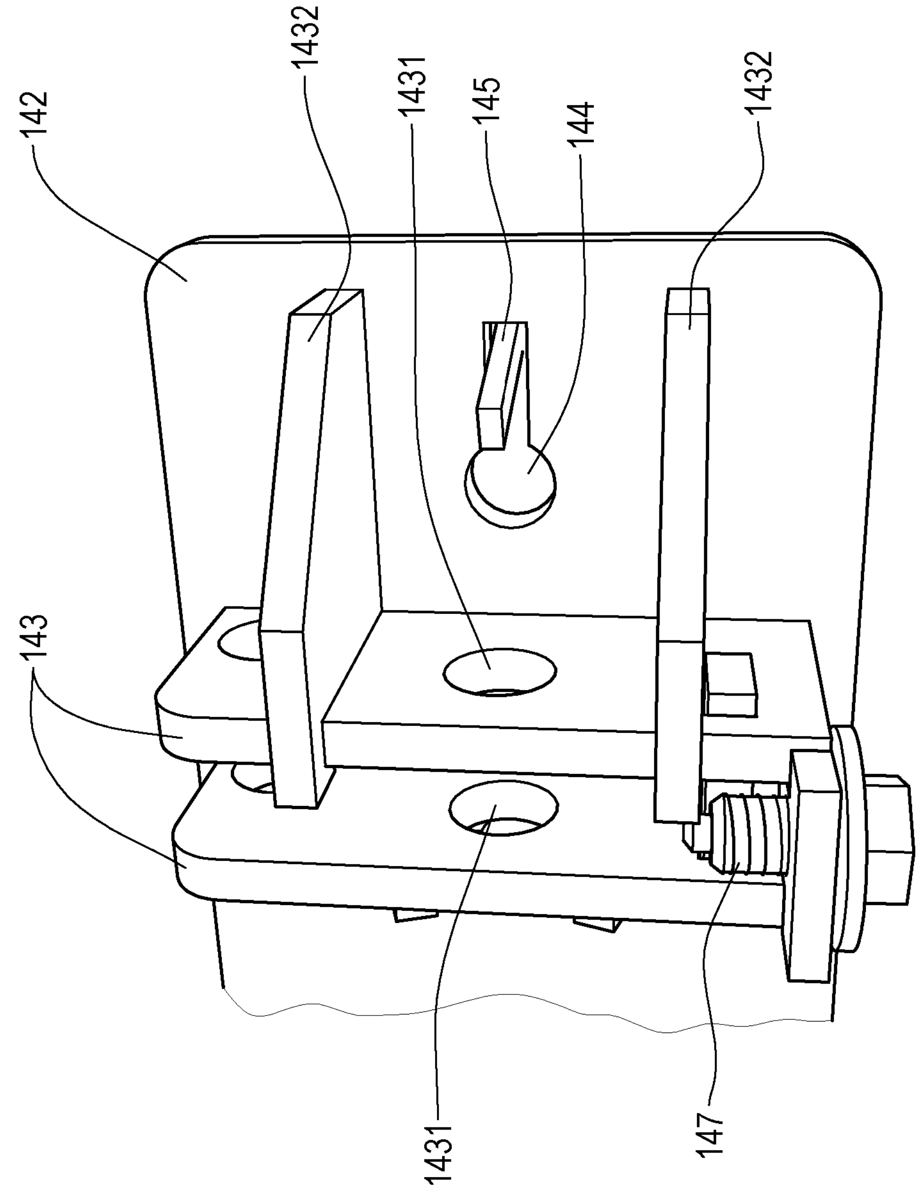
Figure 16:
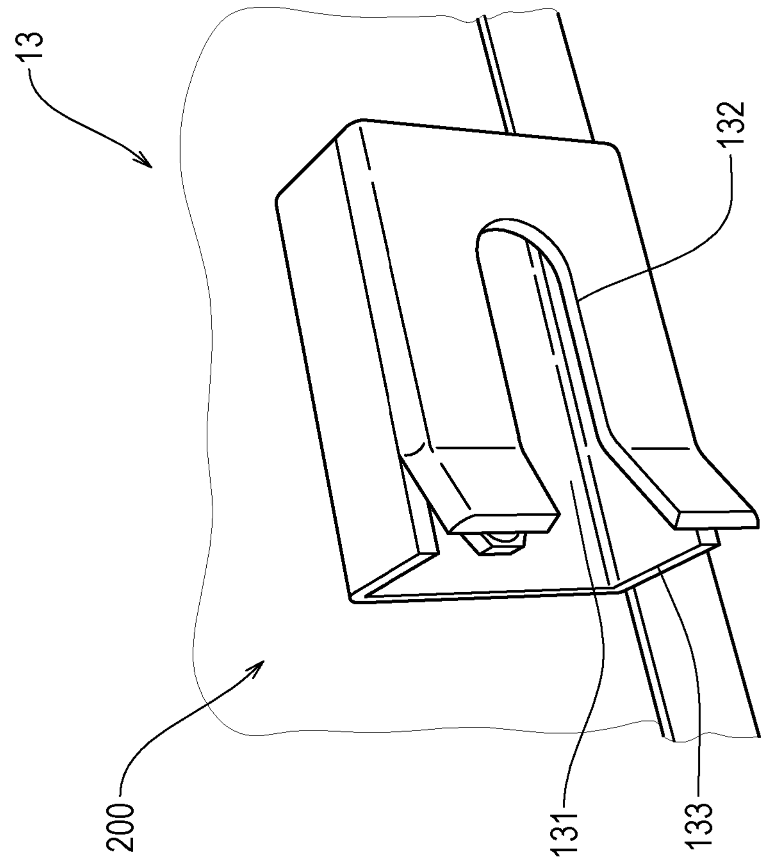
FIGS. 16 and 17 show another part of a toolbox lock.
Figure 17:
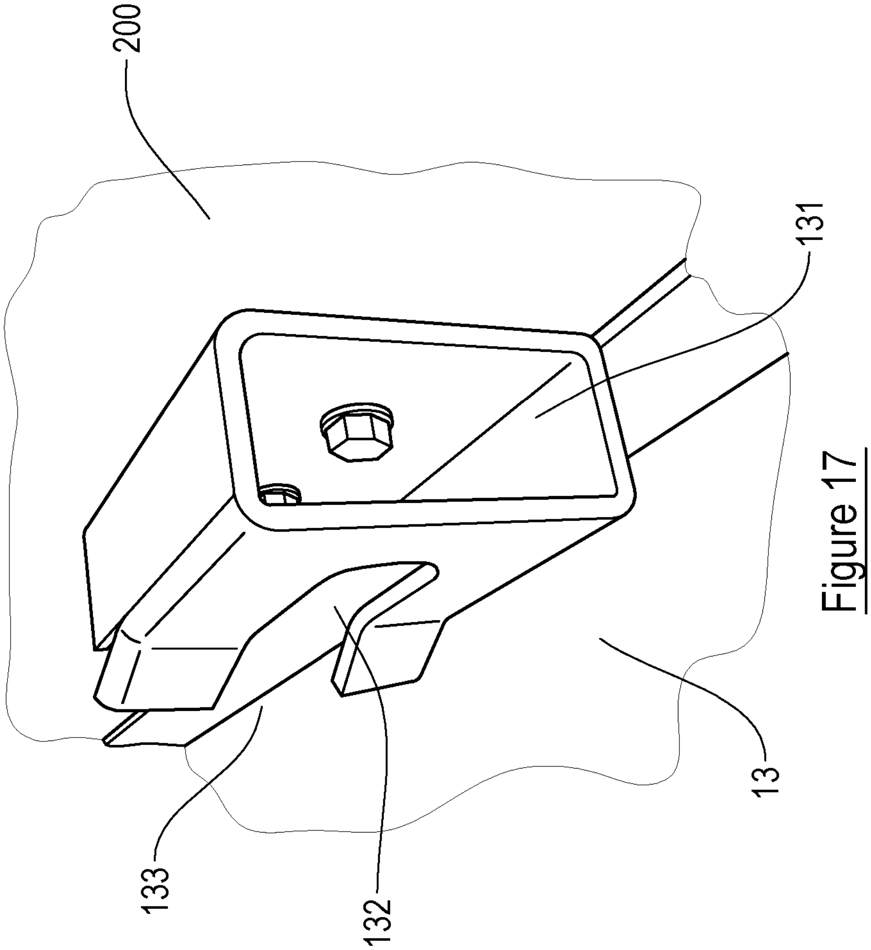
Figure 18:
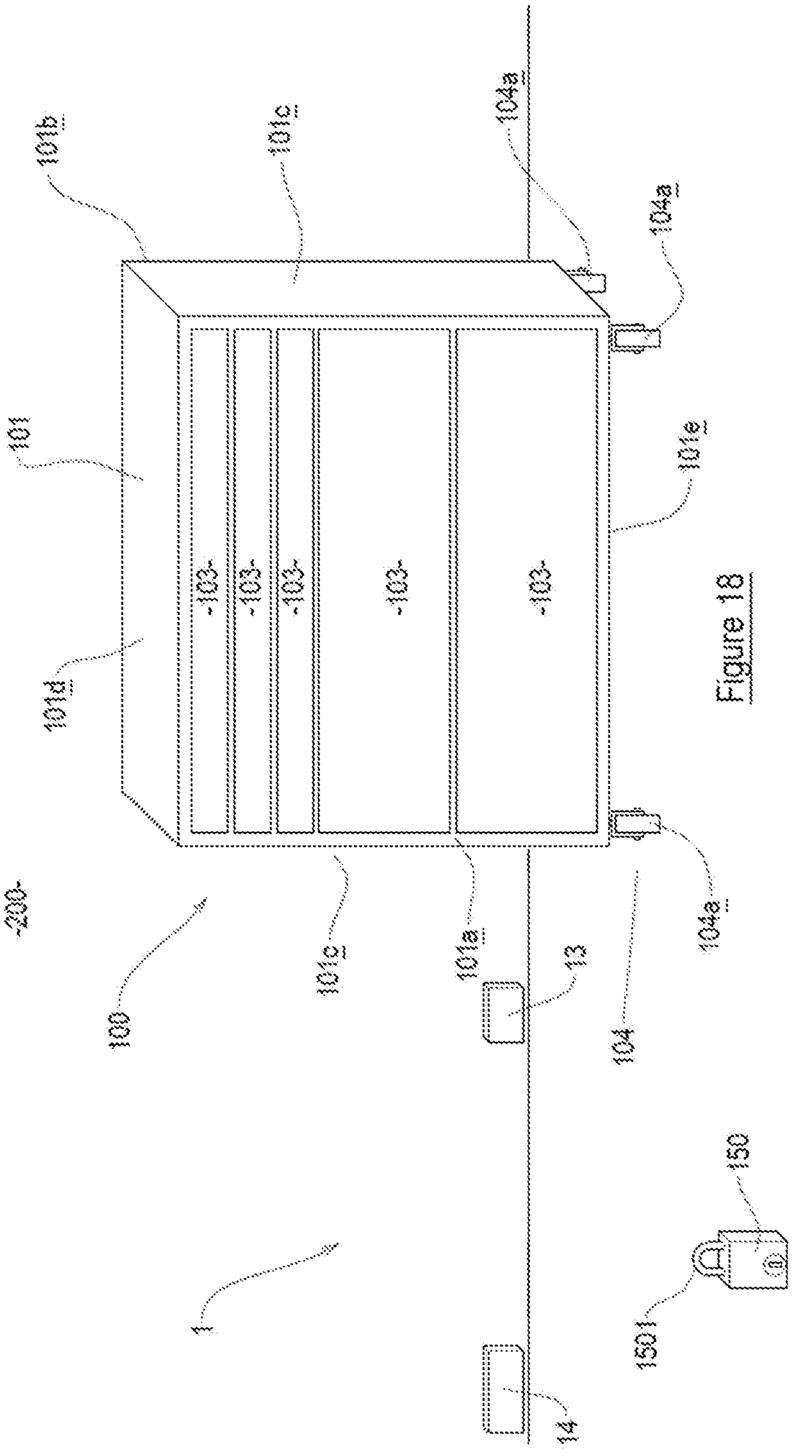
FIG. 18 shows a toolbox and toolbox lock.
Figure 19:
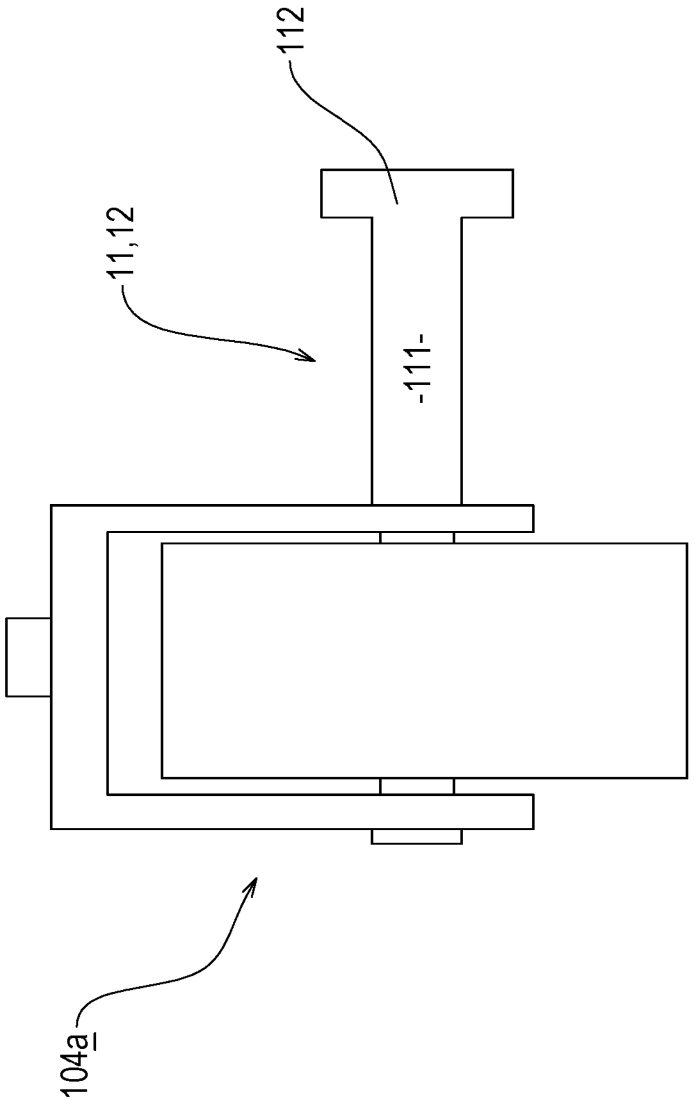
FIG. 19 shows a castor.

With reference to FIGS. 1 to 19, embodiments of the present invention include a toolbox lock 1. The toolbox lock 1 is configured to secure a toolbox 100 to a support structure 200 such as a wall.

The toolbox 100 may comprise a toolbox body 101 which is supported with respect to a floor surface by a ground engaging mechanism 104 (which may include one or more wheels or castors 102 and may, therefore, have the form of a wheeled cabinet). The toolbox body 101 defines a tool storage volume for the storage of one or more tools—such as hand tools (e.g. spanners (i.e. wrenches), screwdrivers, sockets, clamps, pliers, and the like). The toolbox body 101 may carry (and include) one or more drawers 103 or other arrangements or partitions which at least partially define portions of the tool storage volume and which allow for organisation of one or more tools stored therein. For example, a toolbox body 101 may carry one or more drawers 103 which are each moveable (with respect to the rest of the toolbox body 101) between an open and a closed condition independently of each other (or in groups). When a drawer 103 is in the open condition, access is provided to one or more tools stored in that drawer 103. When a drawer 103 is in the closed condition, access to one or more tools stored in that drawer 103 is inhibited or substantially prevented. The or each drawer 103 may be slideably mounted (on a linear or curved runner) with respect to another part of the toolbox body 101.

In some embodiments, the toolbox body 101 includes one or more doors which are each configured to move with respect to another part of the toolbox body 101 to provide access to at least part of the tool storage volume when in an open condition and to inhibit or substantially prevent such access when in a closed condition. The or each door may be pivotably mounted (e.g. by a hinge mechanism) to another part of the toolbox body 101. The or each door may be slideably mounted (on a linear or curved runner) with respect to another part of the toolbox body 101.

The one or more doors and/or drawers 103 which may be provided are examples of closure arrangements moveable between an open and a closed condition.

The toolbox body 101 (including any closure arrangements) may have a generally cuboid form. The toolbox body 101 may have a front face 101*a* in relation to which one or more closure arrangements (as described above) are provided. The toolbox body 101 may include a rear face 101*b* which generally opposes the front face 101*a* across a depth of the toolbox body 101. The toolbox body 101 may include two opposing side faces 101*c* which oppose each other across a width of the toolbox body 101. The toolbox body 101 may include a top face 101*d* which generally faces upwardly with the toolbox 101 in a typically orientation and bottom face 101*e* which generally faces downwardly with the toolbox 101 in the typical orientation—the top face 101*d* and bottom face 101*e* generally opposing each other across a height of the toolbox body 101.

Each face 101*a,b,c,d,e* of the toolbox body 101 may be a generally planar face. One or more of the faces 101*a,b,c,d,e* may include one or more closure arrangements (as described above). In many embodiments, however, all or the majority of the closure arrangements are provided in the front face 101*a*. The top face 101*d* may include one or more other features protruding therefrom or associated therewith. For example, in some embodiments, the top face 101*d* forms a closure arrangement in the form of a lid which is pivotably mounted with respect to another part of the toolbox body 101 to provide access to a part of the tool storage volume generally towards the top of the toolbox body 101 (a part of the volume which may be partially defined by a shelf which is generally parallel to the bottom face but spaced apart therefrom).

The toolbox body 101 may be formed from sheet metal—such as steel, stainless steel, or aluminium, for example.

In some embodiments, the side faces 101*c*, and/or the bottom face 101*e*, and/or the top face 101*d* are each formed from a respective single sheet of material.

The toolbox body 101 may include, for example, an internal frame (not shown) which supports one or more sheets of material forming the faces 101*a,b,c,d,e* thereof.

Towards the bottom face 101*e* the ground engaging mechanism 104 is provided. The ground engaging mechanism 104 may include one or more wheels which may be in the form of respective castors 104*a* (each castor 104*a* comprising a wheel which is rotatable amount an axle axis and a direction axis, the axle axis and direction axis being generally perpendicular to each other). The or each castor 104*a* is configured to allow the movement of the toolbox 100 across a ground surface and, in some embodiments, this movement may be permitted in substantially any direction due to the configuration of the or each castor 104*a* (and, in particular, the ability of each wheel of each castor 104*a* to rotate about its direction axis).

In some embodiments, each castor 104*a* includes a plurality of wheels which are configured for rotation about a common axle axis for that castor 104*a* (and a common direction axis).

The toolbox 100 may include a plurality of parts and each part may include its own toolbox body 101 as described above. The plurality of toolbox bodies 101 may be attached to each other—each with one stacked on another. In a stacked configuration, the bottom most toolbox body 101 or bodies 101 may include a ground engaging mechanism 104.

A first lock engagement member 11 is mounted to the toolbox 100. In some embodiments, the first lock engagement member 11 may be mounted to the ground engagement mechanism 104 of the toolbox 100 and may, in such embodiments, be mounted to a castor 104*a* thereof. In some embodiments, the first lock engagement member 11 may be mounted to an axle of a castor 104*a* or other fixing element which is used to secure the wheel—the axle axis may be aligned with and parallel to a longitudinal axis of the first lock engagement member 11.

In some embodiments, the first lock engagement member 11 may be mounted to the toolbox body 101. In such embodiments, the first lock engagement member 11 may be mounted such that its longitudinal axis is generally parallel or perpendicular to a plane of the rear face 101*b* of the toolbox body 101.

In some embodiments, a second lock engagement member 12 may be mounted to the toolbox 100. The second lock engagement member 12 may be remote from the first lock engagement member 11. In some embodiments, the first and second lock engagement members 11,12 are separated by a distance which is approximately equal to the width of the toolbox 100 or the depth of the toolbox 100.

In some embodiments, the second lock engagement member 12 may be mounted to the ground engagement mechanism 104 of the toolbox 100 and may, in such embodiments, be mounted to a castor 104*a* thereof. In some embodiments, second lock engagement member 12 may be mounted to an axle of a castor 104*a* or other fixing element which is used to secure the wheel—the axle axis may be aligned with and parallel to a longitudinal axis of the second lock engagement member 12. The first and second lock engagement members 11,12 of some embodiments are mounted to respective different castors 104*a* of the ground engagement mechanism 104.

In some embodiments, the second lock engagement member 12 may be mounted to the toolbox body 101. In such embodiments, the second lock engagement member 12 may be mounted such that its longitudinal axis is generally parallel to a plane of the rear face 101*b* of the toolbox body 101.

The toolbox lock 1 includes a first lock body 13 and a second lock body 14. The first lock body 13 and second lock body 14 are configured to engage respective parts of the toolbox 100 or attachments thereof. In some embodiments, each lock body 13,14 is configured to engage a respective lock engagement member 11,12. In some embodiments, the first lock body 13 is configured to engage a castor 104*a* or a part thereof, and the second lock body 14 is configured to engage the second lock engagement member 12 (in such embodiments, the first lock engagement member 11 may not be provided). In some embodiments, the first lock body 13 is configured to engage a first castor 104*a* or a part thereof, and the second lock body 14 configured to engage a second castor 104*a* or a part thereof.

The first lock body 13 in some embodiments is in the form of a receiver which is configured to receive a part of the toolbox 100 or an attachment thereof. As such, in some embodiments, all or part of a castor 104*a* may be receivable within the first lock body 13. In some embodiments, all or a part of the first lock engagement member 11 is receivable within the first lock body 13.

The first lock body 13 is configured such that a part of the toolbox 100 or an attachment thereof can be moved into engagement with the first lock body 13 from at least one direction but the engagement inhibits or substantially prevents movement of that part of the toolbox 100 or the attachment thereof with respect to the first lock body 13 in at least one other direction.

In some embodiments, the first lock body 13 defines a channel 131 to receive a part of the toolbox 100 or an attachment thereof. The first lock body 13 may further define an elongate slot 132 and an access aperture 133 for the channel 131. The access aperture 133 may be located towards an end open end of the elongate slot 132. Accordingly, a part of the toolbox 100 or an attachment thereof may be inserted into the channel 131 through the access aperture 133 and then moved along the elongate slot 132 away from the access aperture 133. The received part or attachment may be configured (i.e. sized and shaped) such that it cannot be removed from the channel 131 via the elongate slot 132 but would instead need to be moved back out through the access aperture 133. The received part or attachment may be coupled to another part which extends through the elongate slot 132 and which is coupled to the toolbox 100 or the rest of the toolbox 100 as the case may be.

In embodiments in which it is at least a part of the first lock engagement member 11 which is received by the first lock body 13, the first lock engagement member 11 may comprise an elongate member 111 with a proximal end which is coupled to the toolbox 100 (e.g. to a castor 104*a*), and a free end. The free end may carry an abutment member or head 112 which has a larger thickness (e.g. diameter) than the elongate member 111. Accordingly, the first lock engagement member 11 may have a generally T-shaped cross-sectional shape (through a plane which is parallel to a longitudinal axis of the elongate member 111). The elongate member 111 and the abutment member 112 may have respective circular cross-sectional shapes (through a plane generally perpendicular to the longitudinal axis of the elongate member 111).

The first lock body 13 may define a channel 131 which is generally rectangular in cross-sectional shape. Accordingly the first lock body 13 may include a rear wall which is configured to be secured to the support structure 200 (such as a wall)—for example, the rear wall may define one or more apertures configured to receive respective bolts or screws. Upper and lower sidewalls may extend from respective upper and lower edges of the rear wall and may carry a front wall (which is generally parallel to the rear wall and separated therefrom by a depth of the channel 131). The front wall may define the elongate slot 132 and the front wall, rear wall, and side walls may define the access aperture 133.

In some embodiments, the access aperture 133 has a depth which is greater than the depth of the channel 131. This may be achieved by flared portions of the front wall—which may be flared portions above and below the elongate slot 132.

In some embodiments, therefore, the abutment member 112 may be aligned with the access aperture 133 for reception thereby. Movement of the abutment member 112 through the access aperture 133 allows the elongate member 111 to be partially received by the elongate slot 132. The elongate member 111 may be moved along the elongate slot 132 away from the access aperture 133 such that the abutment member 112 is received within a part of the first lock body 13 which may be remote from the access aperture 133. Accordingly, the first lock engagement member 11 and the first lock body 13 may be engaged. Disengagement requires movement of the elongate member 111 (and abutment member 112) back along the elongate slot 132 and out of the access aperture 133—as movement of the first lock engagement member 11 out of engagement in a direction roughly parallel to the longitudinal axis of the elongate member 111 is inhibited or substantially prevented by the abutment member 112 abutting the first lock body 13 adjacent the elongate slot 132.

In some embodiments, access to the channel 131 from an end of the first lock body 13 remote from the access aperture 133 is inhibited by a plate or mesh at that end of the first lock body 13 (which extends across at least part of the channel 131).

Figure 20:
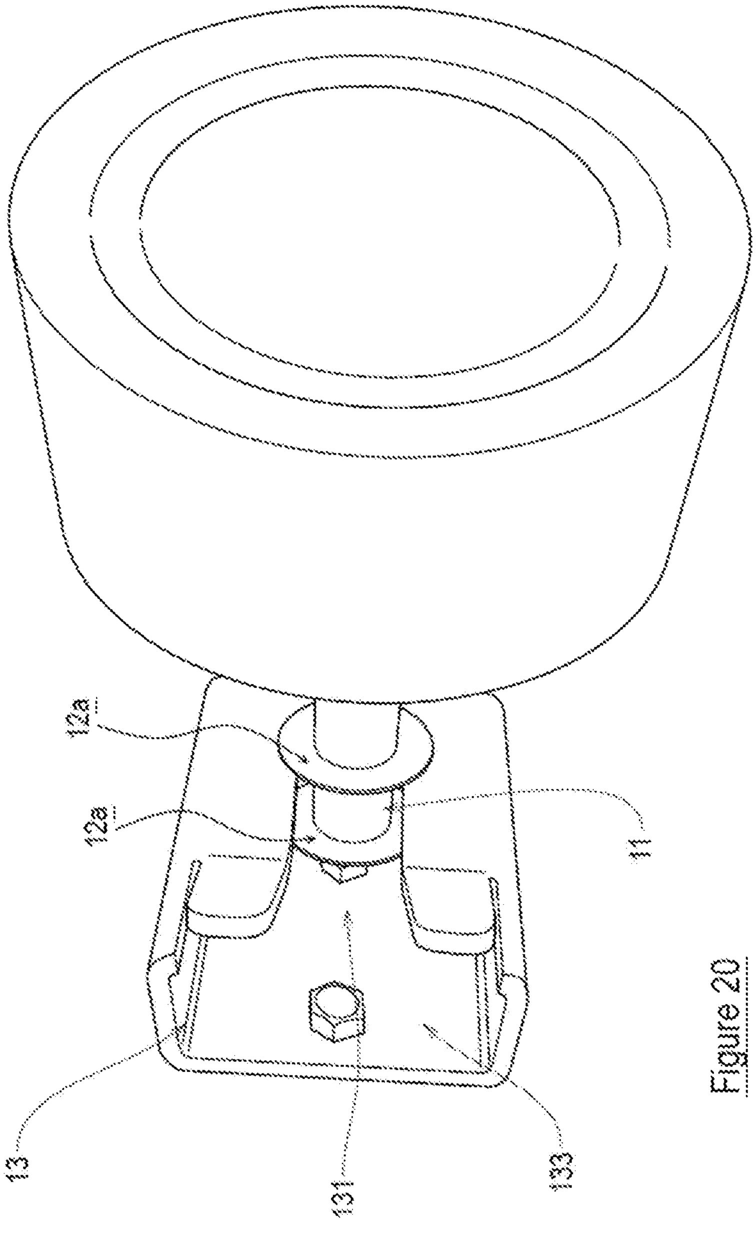
FIG. 20 shows a castor and part of a toolbox lock.
Figure 21:
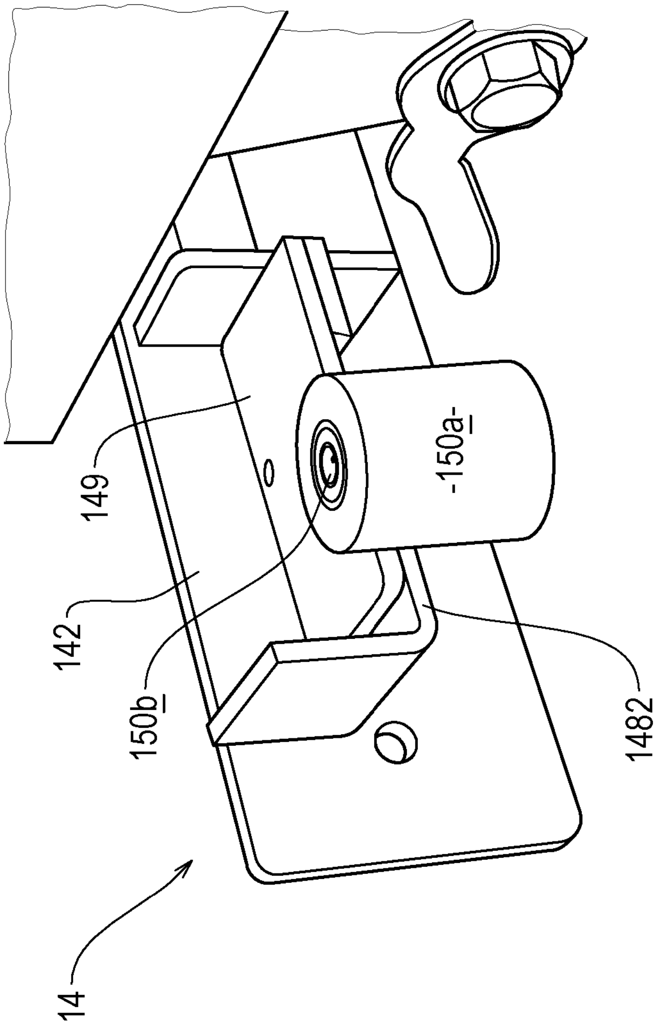
FIGS. 21 and 22 show views of parts of a toolbox lock.

In some embodiments, the first lock engagement member 11 has a double headed configuration (as depicted in FIG. 20). Accordingly, the free end may carry a pair of abutment members or heads 12*a* which define a recess therebetween. The recess defined by the pair of abutment members or heads 12*a* may be configured to receive at least part of the first lock body 13. In some embodiments, the recess is configured to receive at least part of the front wall of the first lock body 13 and, as such, the depth of the recess (between the pair of abutment members or heads 12*a*) may be greater than a thickness of the front wall of the first lock body 13. In some embodiments, a first of the pair of abutment members or heads 12*a* may be locatable to one side of the front wall and a second of the pair of abutment members of the heads 12*a* may be locatable to the opposing side of the front wall when the first lock engagement member 11 is at least partially received by the elongate slot 132. The pair of abutment members or heads 12*a* may assist the user in locating the first lock engagement member 11 in the first lock body 13 and/or may assist in the guiding of the first lock engagement member 11 along the elongate slot and/or may assist in blocking at least part of the first lock body 13 from interference.

The second lock body 14 is configured for lockable and selective engagement of a part of the toolbox 100 or an attachment thereof. Accordingly, part of the toolbox 100 or an attachment thereof may be engaged with the second lock body 14 and the second lock body 14 may be configured to be locked to that part of the toolbox 100 or attachment such that movement of the toolbox 100 out of engagement is inhibited or substantially prevented.

The second lock body 14 in some embodiments includes a hook 141 which is configured to capture a part of the toolbox 100 or an attachment thereof. As such, in some embodiments, all or part of a castor 104*a* may be captureable by the second lock body 14. In some embodiments, all or a part of the second lock engagement member 12 is captureable by the second lock body 14.

The second lock body 14 is configured to be actuated between a locked condition in which the second lock body 14 is inhibited or substantially prevented from disengaging a part of the toolbox 100 or an attachment thereof (e.g. the hook 141 is inhibited or substantially prevented from releasing the captured part or attachment) and an unlocked condition in which the second lock body 14 is not substantially prevented from disengaging a part of the toolbox 100 or an attachment thereof (e.g. the hook 141 is not substantially prevented from releasing the captured part or attachment).

The second lock body 14 may comprise a main body 142 which is configured to be mounted to the support structure 200 (such as a wall). The main body 142 may comprise a mounting plate which, in some embodiments, is generally rectangular in shape. The main body 142 may define one or more mounting apertures 144. In some embodiments, there are two or more such mounting apertures 144 defined and in some embodiments, there are three such mounting apertures 144 defined. In some embodiments, the two or more (or three) mounting apertures 144 are generally aligned along a common linear axis of the main body 142 (that axis being parallel to and spaced apart from a bolt axis).

At least one of the mounting apertures 144 is protected by a shield member 145. The shield member 145 may take a number of different forms and is configured to inhibit access to a bolt, screw, or other attachment member which is received by the mounting aperture 144 and which is configured to help to secure the main body 142 to the support structure.

In some embodiments, a pair of shield members 145 is provided for each mounting aperture 144. Each shield member 145 may comprise a protrusion which extends outwardly from the main body 142 adjacent a mounting aperture 144. In some embodiments, each shield member 145 may be formed from material of the main body 142—this material may have been at least partially cut or otherwise severed to form at least part of the mounting aperture 144 to which it is adjacent and then bent or re-attached such that it protrudes at an angle with respect to a plane of the main body 142 of the second lock body 14.

The hook 141 may be pivotably mounted to the main body 142 of the second lock body 14. This pivotable mounting may be between a pair of protective side plates 143 such that the hook 141 is sandwiched between the protective side plates 143 at a proximal end of the hook 141. The protective side plates 143 may extend away from the main body 142 and this extension may be generally in a direction which is perpendicular to the plane of the main body 142 of the second lock body 14. The hook 141 may be sized and shaped to fit, at least partially, between the two protective side plates 143 if provided.

The pivotable mounting of the hook 141 to the main body 142 may be a pivotal mounting to one or both of the pair of protective side plates 143. For example, in some embodiments, the two protective side plates 143 may define respective pin receiving apertures which are configured to receive a pin 146 such that the pin 146 is supported by both protective side plates 143 and extends there between.

The hook 141 may define a pin receiving aperture 1411 which is configured to receive at least part of the pin 146 which extends between the two protective side plates 143.

The hook 141 may be pivotable between a stowed and an operative condition. In the stowed condition, the hook 141 extends mainly in a direction generally parallel to a plane of the main body 142. The operative condition, the hook 141 extends mainly in a direction generally perpendicular to the plane of the main body 142 such that it is in position to engage a part of the toolbox 100 or an attachment thereof. In the operative condition the hook 141 extends away from the support structure 200 a first distance and in the stowed condition the hook 141 extends away from the support structure 200 a second distance which is less than the first distance.

The hook 141 may be configured such that is retained in the stowed condition and requires user interaction to move the hook 141 into the operative condition. This user interaction may be the actuation of a control mechanism or, for example, the lifting of the hook 141 relative to the main body 142.

In some embodiments, the hook 141 defines the pin receiving aperture 1411 and the pin receiving aperture 1411 is elongate such that a length of the pin receiving aperture 1411 is greater than a width of the pin receiving aperture 1411. The width of the pin receiving aperture 1411 may be generally equal to (or marginally greater than) a diameter of the pin 146 such that the hook 141 is mountable to the pin 146 via the pin receiving aperture 1411. The length of the pin receiving aperture 1411 may be generally aligned along a longitudinal axis of the hook 141. Accordingly, with the hook 141 in the operative condition, the pin 146 is received by a first part of the pin receiving aperture 1411 towards a first end of that aperture 1411. With the hook 141 in the stowed condition, the pin 146 is received by a second part of the pin receiving aperture 1411 towards a second end of that aperture 1411. The position of the pin receiving aperture 1411 and the pin 146 may be such that with the hook 141 in the stowed condition, a longitudinal edge of the hook 146 abuts the main body 142. In addition, a corner between the longitudinal edge and an end edge is below an axis of the pin 146. This inhibits or substantially prevents the rotation of the hook 141 with respect to the main body 142 into the operative condition.

With the hook 141 in the stowed condition, in such embodiments, movement of the hook 141 to the operative condition requires lifting of the hook 141 such that the corner is closer to the axis of the pin 146. The corner may have a radius or may be otherwise configured such that when it is in the hook 141 is lifted, there is sufficient room for the hook 141 to rotate about the pin 146 and the corner to move with respect to the main body 142 during that rotational movement of the hook 141. Thus, with the hook 141 so lifted, rotation of the hook 141 about the pin 146 is no longer inhibited and the hook 141 is rotatable to the operative condition.

The second lock body 14 may, in some embodiments, include a resilient biasing arrangement 147 which is configured to act on the hook 141. The resilient biasing arrangement 147 is configured to bias the hook 141 into an engaging position of the operative condition. The application of a sufficient force against the biasing force of resilient biasing arrangement 147 moves the hook 141 downwardly towards a locking position of the operative condition.

The hook 141 defines a bolt receiving aperture 1412 which is configured to receive at least part of a bolt 148. In embodiments the protective side plates 143 each define respective further bolt receiving apertures 1431. The further bolt receiving apertures 1431 are generally aligned with each other such that the bolt 148 of the second lock body 14 is configured to pass through the further bolt receiving apertures 1431. Furthermore, with the hook 141 in the locking position of the operative condition, the bolt receiving aperture 1412 is aligned with the further bolt receiving apertures 1431 such that at least part of the bolt 148 is receivable by the bolt receiving aperture 1412 and the further bolt receiving apertures 1431 to lock the hook 141 in position with respect to the main body 142.

The resilient biasing arrangement 147 may comprise a spring screw—a threaded bolt carrying a biasing member which is biased towards a position with respect to a body of the threaded bolt by an internal spring. Other resilient biasing arrangements 147 are envisaged.

In some embodiments, the resilient biasing arrangement 147 is configured to act on a lower longitudinal edge of the hook 141. In some embodiments, the resilient biasing arrangement 147 is configured to act on the end edge of the hook 141.

In some embodiments, the resilient biasing arrangement 147 is mounted with respect to the main body 142 and is configured to act on a portion of the hook 141 or a member mounted thereto. For example, a member may be mounted to the hook 141 and configured to engage the resilient biasing arrangement 147. The resilient biasing arrangement 147 may be mounted to a plate or other member which is mounted to the main body 142. The resilient biasing arrangement 147 may comprise a generally rigid member which abuts a member which is mounted to the hook 141 and a spring (or other resilient biasing means) may act on the generally rigid member which, in turn, acts on the member which is mounted to the hook 141. When the hook 141 moves against the biasing force, the generally rigid member may move with respect to the main body 142 (e.g. through an aperture defined thereby or by a member or plate mounted thereto). The generally rigid member may include a stop to inhibit movement of the generally rigid member beyond a desired position under the biasing force.

Accordingly, in some embodiments, the resilient biasing arrangement 147 is mounted next to or otherwise adjacent the hook 141 and, in some embodiments, the resilient biasing arrangement 147 is mounted such that it is in generally the same plane as the hook 141.

As will be appreciated, the resilient biasing arrangement 147 may take any number of different forms and may be mounted in a number of different ways to achieve the desired biasing of the hook 141.

The bolt 148 may, in some embodiments, comprise an elongate shaft 1481 with a distal end which may include one or more inclined surfaces (and which may be generally cone shaped) to ease the receipt of the bolt 148 by the bolt receiving aperture 1412 and the further bolt receiving aperture 1431. The elongate shaft 1481 may be attached to a shuttle 1482 of the bolt 148 which is configured for movement with the elongate shaft 1481. The shuttle 1482 defines one or more (which may be two or three) padlock receiving apertures 1483. In some embodiments, the shuttle 1482 is a generally planar member.

The bolt 148 has a bolt axis which extends along a central longitudinal axis of the elongate shaft 1481. The bolt 148 is moveable along the bolt axis between a position in which a portion of the bolt 148 (e.g. a portion of the elongate shaft 1481) is received by the bolt receiving aperture 1412 and the further bolt receiving apertures 1431 (the 'bolted position') and a position in which a part of the bolt 148 does not extend through at least the bolt receiving aperture 1412 and may not extend through at least one of the further bolt receiving apertures 1431 (the 'unbolted position').

With the bolt 148 in the bolted position, the one or more padlock receiving apertures 1483 is aligned with one or more corresponding further padlock receiving apertures 1491 which are defined by a padlock plate 149.

The padlock plate 149 is mounted to the main body 142 and is generally immoveable with respect thereto.

The one or more padlock receiving apertures 1483 and the one or more further padlock receiving apertures 1491 are configured to receive a lock member 1501 of a padlock 150 to lock the bolt 148 with respect to the main body 142.

An end portion of the shuttle 1482 away from the elongate shaft 1481 may include a handle portion which is configured to be grasped by a user to allow manual movement of the shuttle 1482 with respect to the padlock plate 149. The handle portion may expend generally perpendicular to the elongate shaft 1481.

The padlock plate 149 may include one or more bolt guide members 1492 which define one or more guide apertures 1493 which are each configured to receive a portion of the bolt 148 (e.g. a portion of the elongate shaft 1481) and to guide movement thereof with respect to the main body 142. The one or more guide members 1492 may, in some embodiments, be attached to the main body 142 in addition to or as an alternative to being part of the padlock plate 149.

In some embodiments, the shuttle 1482 is configured to be at least partially supported by the padlock plate 149 and may be located generally above or generally below (in a normal orientation) the padlock plate 149. In some embodiments, one or more additional support elements (not show) may be provided to support, at least in part, the shuttle 1482. The one or more additional support elements may be secured to the main body 142 and may be integrally formed therewith or attached thereto.

In some embodiments, the shuttle 1482 and/or the padlock plate 149 includes a lock **150*a*. A body of the lock 150*a* may be secured to the shuttle 1482 or padlock plate 149 and a locking portion of the lock 150*a* may be configured to engage, selectively, the other of the shuttle 1482 and padlock plate 149 to inhibit movement of the shuttle 1482 with respect to the padlock plate 149 in a locked state (in other words to lock the shuttle 1482 with respect to the padlock plate 149**) or to allow such movement in an unlocked state.

The lock 150 a may include a keyhole 150*b* or other actuator with which the lock 150*a* can be moved from a locked to an unlocked state. The keyhole 150*b* or other actuator may face upwardly (in a normal orientation) for ease of access. A key may be provided and configured to interact with the keyhole 150*b* or other actuator to cause the lock 150*a* to transform between the locked and unlocked state. In some embodiments, the body of the lock 150*a* may have a generally cylindrical form. In some embodiments, the body of the lock 150*a* may be integrally formed or welded to (or otherwise immovably secured) to the shuttle 1482 or padlock plate 149. In some embodiments, the body of the lock 150*a* includes a slot through which a portion of the shuttle 1482 or padlock plate 149 may pass when the lock 150*a* is in an unlocked state.

As will be appreciated, a lock 150*a* which is generally permanently (i.e. immovably) mounted to the shuttle 1482 and/or the padlock plate 149 may be viewed as an 'integral lock' (although such a lock may not necessarily be integrally formed therewith).

In some embodiments, one or more further protective plates 1432 may be provided which are each configured to restrict or inhibit access to one or more parts of the toolbox lock 1. In some embodiments, a first of the pair of protective side plates 143 which is remote from the padlock plate 149 may carry and/or be attached to two further protective plates 1432 which are each positioned towards a respective longitudinal edge of the main body 142. A first of the further protective plates 1432 may be positioned adjacent an end of the pin 146 and a second of the further protective plates 1432 may be positioned adjacent a further bolt receiving aperture 1431. In some embodiments, first and second further protective plates 1432 are located either side of a further bolt receiving aperture 1431.

In some embodiments, an elongate protective plate 1432*a* is provided which is configured to protect at least part of the elongate shaft 1481 from interference. The elongate protective plate 1432*a* may be aligned with and/or even formed with (or secured to) the padlock plate 149 or shuttle 1482. One or more further such elongate protective plates 1432*a* may be provided also configured to inhibit interference with the elongate shaft 1481. The or each elongate protective plate 1432*a* or further elongate protective plate may have a longitudinal axis which is generally parallel to and spaced apart from a longitudinal axis of the elongate shaft 1481. The elongate protective plate 1432*a* and/or further elongate protective plate may carry the resilient biasing arrangement 147 in some embodiments.

In some embodiments, the pin 146 has a generally cylindrical shape with a head which is shaped and size such that the head cannot pass through the one or more mounting apertures 144. The pin 146 is configured to be mounted such that a portion of the pin 146 is immediately adjacent the first of the further protective plates 1432. That portion of the pin 146 may include a flattened portion which is configured such that it conforms to a surface of the first further protective plate 1432 and to abut thereagainst. As will be appreciated, in such embodiments, rotation of the pin 146 with respect to the further protective plate 1432 is inhibited or substantially prevented by the abutment of the flattened portion of the pin 146 and the further protective plate 1432.

The pin 146 may define a securing aperture 1461 generally remote from the head and towards the flattened portion. The securing aperture 1461 may extend through an entire width (e.g. diameter) of the pin 146. With the rotation of the pin 146 inhibited or substantially prevented—as discussed above—the securing aperture 1461 may be generally aligned with a corresponding securing aperture 1421 through a depth of the main body 142. Accordingly, a split pin or other securing member may be inserted through the securing aperture 1461 and corresponding securing aperture 1421 to inhibit or substantially prevent removal of the pin 146 from its mounted position.

The hook 141, in some embodiments, comprises a planar elongate member with a pair of opposing longitudinal edges coupled by an end edge at a proximal end of the hook 141. Ata distal end of the hook 141 is a hook member 1413.

The hook member 1413 at least partially defines a hook recess 1414 between an internal edge of the hook member 1413 and a body of the hook 141. The hook recess 1414 is configured to receive a part of the toolbox 100 or an attachment thereof (generally as described herein).

An outer edge of the hook member 1413 from the upper longitudinal edge to a front edge of the hook 141 may be a curved.

The hook recess 1414 has an entrance which is defined between the hook member 1413 and a part of the hook body. An entrance portion of the hook member 1413 adjacent the entrance to the hook recess 1414 may be shaped so as to aid movement of a part of the toolbox 100 or an attachment thereof into the hook recess 1414. Accordingly, the entrance portion may be curved or angled from the front edge of the hook 141 towards the hook recess 1414.

An exit portion of the hook member 1413 adjacent the entrance portion is also, in some embodiments, shaped so as to aid movement of a part of the toolbox 100 or an attachment thereof out of the hook recess 1414.

A retaining portion of the hook member 1413 adjacent the exit portion and remote from the entrance portion may be shaped to retain a part of the toolbox 100 or an attachment thereof when the hook 141 is in the locking position of the operative condition.

The hook recess 1414 is at least partially defined by a body of the hook 141 (as discussed above). In particular, in embodiments, an angled edge of the body at least partially defines the hook recess 1414. The angled edge is located such that it generally opposes the hook member 1413 across the hook recess 1414. The angled edge is angled with respect to a longitudinal axis of the hook 141 that a part of the toolbox 100 or an attachment thereof driven against the angled edge will cause the hook 141 to move downwardly—against the biasing force of the resilient biasing arrangement 147 in applicable embodiments. As will be appreciated, the hook 141, therefore, moves under this force into the locking position of the operative condition such that the bolt 148 may be moved into the bolted position.

With the hook 141 in the locking position of the operative condition, the part of the toolbox 100 or the attachment thereof is inhibited or substantially prevented from leaving the hook recess 1414 by the hook member 1413 (and, in particular, the retaining portion thereof).

Figure 22:
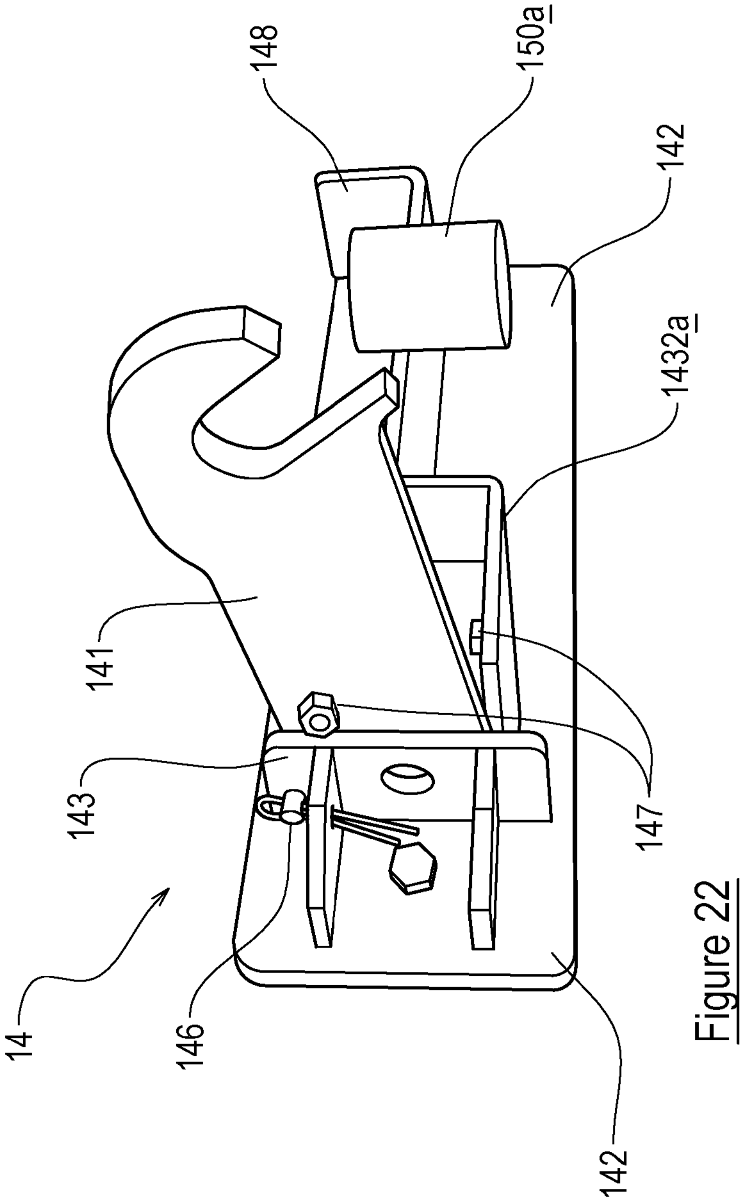

Another form of part of the hook 141, according to some embodiments of the invention is show in FIG. 22.

The hook 141 is held in the locking position by the bolt 148 in the bolted position. A padlock or other selective access lock may be provided. A portion of the padlock may be inserted through a padlock receiving aperture 1483 and a further padlock receiving aperture 1491 to secure the bolt 148 in a substantially fixed position with respect to the main body 142—and keep the bolt 148 in the bolted position.

The bolt 148 may be moved to the unbolted position. Movement of the part of the toolbox 100 or attachment thereof away from the angled edge of the hook body will allow the hook 141 to move towards the engaging position of the operative condition (i.e. out of the locking condition) under the force applied by the resilient biasing arrangement 147.

With the hook 141 in the engaging position, further movement of the part of the toolbox 100 or the attachment thereof towards the hook member 1413 will bring that part or attachment into engagement with the exit portion of the hook member 1413. Further movement of that part or attachment in generally the same direction will cause the part or attachment to leave the hook recess 1414 through the entrance thereto. In some embodiments, the further movement forces the hook 141 upwardly away from the locking and engaging positions of the operative condition (generally towards the stowed condition but not into the stowed condition in some embodiments).

As will be appreciated, the hook 141 may be moved into the stowed condition by rotational movement of the hook 141 upwardly away from the engaging position. The hook 141 may then move linearly with respect to the pin 146 such that the pin 146 occupies a different part of the pin receiving aperture 1411 (as described above).

The hook 141 may be moved into the stowed condition when not in use.

This reduces the distance from which the toolbox lock 1 extends from the support structure—reducing the risk of tripping, damage to property, and damage to the toolbox lock 1.

The support structure 200 to which the first and second lock bodies 13,14 are secured may be, for example a wall. In some embodiments, the first and second lock bodies 13,14 are secured to respective different support structures 200. The or each support structure 200 may be a floor mounted member which extend upwardly from a floor surface—such as a post or pillar.

As will be understood, the part of the toolbox 100 or the attachment thereof which is received by the hook recess 1414 may be the second lock engagement member 12 or a part thereof. The second lock engagement member 12 may be of the same form as the first lock engagement member 11 described above.

Embodiments of the present invention allow a toolbox 100 to be secured to a support structure 200 to frustrate efforts, for example, to steal the toolbox 100. The toolbox lock 1 is, therefore, in embodiments, a security mechanism.

As mentioned above, in some embodiments the second lock engagement member 12 is mounted to an axle of a castor 104*a* or other fixing element which is used to secure the wheel. In such embodiments, engagement of the first lock engagement member 11 with the first lock body 13 and then rotational movement of the toolbox 100 about the first lock body 13 and/or the first lock engagement member 11 (which may be rotation about the direction axis of the castor 104*a* to which the first lock engagement member 11 is mounted) will mean that the axle of the castor 104*a* to which the second lock engagement member 12 is mounted will be generally perpendicular to the hook 141 (i.e. generally parallel to the support structure and main body 142) as the second lock engagement member 12 approaches the hook 141. In embodiments, the second lock engagement member 12 is configured such that, as it approaches the second lock body 14, the second lock engagement member 12 extend towards the first lock body 13 (i.e. inwardly with respect to the toolbox 100) and the hook 141 may be located such that it is inwardly (or outwardly) located with respect to the castor 104*a* to which the second lock engagement member 12 is mounted.

The second lock engagement member 12 may enter the hook recess 1414 as described above to secure the second lock engagement member 12 to the second lock body 14 (and, hence, to secure to the toolbox 100 to the support structure). In particular, a portion along a length of the second lock engagement member 12 may abut the entrance portion of the hook member 141 and then move through the entrance of the hook recess 1414 (or may pass through the entrance of the hook recess 1414 without touching the entrance portion of the hook member 141).

The positioning of the first and second lock engagement members 11,12 may be such that engagement with the first and second lock bodies 13,14 results in the operation of one or more closure arrangements of the toolbox 100 being restricted. For example, the front face 101*a* of the toolbox 100 may face the support structure 200 (such as a wall). Accordingly, in such embodiments, not only is removal of the toolbox 100 inhibited but also access to the tools storage volume (or a part thereof) is inhibited by use of the toolbox lock 1.

In some embodiments, the positioning of the first and second lock bodies 13,14 is determined by a dimension of the toolbox 100. For example, in embodiments in which the first and second lock engagement members 11,12 are provided mounted to respective castors 104*a* of the toolbox 100, the positioning of the first and second lock bodies 13,14 may be determined by the spacing of those castors 104*a* with respect to each other.

As will also be appreciated, the first and second lock bodies 13,14 ensure that the toolbox 100 is secured against rotation with respect to the support structure 200.

According to embodiments of the invention, the engagement of the first lock body 13 and a part of the toolbox 100 or an attachment thereof occurs first. As will be appreciated, this engagement then restricts and guides the movement of the second lock engagement member 12 towards the second lock body 14 in such a manner that engagement is possible without additional alignment steps being necessary.

In some embodiments, the first lock body 13 is configured to be secured to a floor surface.

In some embodiments, the padlock plate 149 is located above the shuttle 1482 and in some embodiments the padlock plate 149 is located below the shuttle 1482. In some embodiments, padlock plates 149 are located above and below the shuttle 1482.

At least one of the one or more bolt guide members 1492 may act as a stop for the shuttle 1482 such then when the shuttle 1482 abuts the at least one bolt guide member 1492, the bolt 148 is in the bolted position.

The first and second lock bodies 13,14 may be formed from steel or stainless steel.

In some embodiments, the first and second lock engagement members 11,12 can be retrofitted to an existing toolbox 100. For example, the toolbox 100 may include a pair of castors 104*a* which include respective wheels secured by an axle bolt. Each lock engagement member 11,12 may be secured to the axle bolt (which may require temporary removal of the axle bolt or replacement thereof). In such embodiments, it will be appreciated that the toolbox 100 can be returned to its original state by removal of the first and second lock engagement members 11,12—i.e. there is no or little damage to the toolbox 100.

Some embodiment of the toolbox lock 1 may include a padlock.

As will be appreciated, the lock bodies 13,14 may be configured to receive an attachment of the toolbox 100 in the form of respective castors 104*a* or parts thereof.

The hook 141 is, of course, one example of a member which may be configured for engagement with a part of the toolbox 100 or an attachment thereto.

Embodiments of the present invention have been described with reference to a toolbox 100. It will be apparent that all embodiments disclosed herein may be suitable for use in relation to other objects (in addition to or instead of a toolbox 100). In particular, embodiments of the present invention are suitable for use with an object with a ground engaging mechanism generally as described above in relation to the toolbox 100 (e.g. including one or more castors 104*a* or other forms of wheel). Such objects may define volumes suitable for the storage of other items (i.e. they may be containers)—such as surgical equipment, medical monitoring equipment, weapons, food, jewelry, documents, and the like. For example, the teachings presented above in relation to a toolbox 100 (and the toolbox lock 1) may apply equally to a surgical instrument trolley (and a surgical instrument trolley lock), a stand for medical equipment (and a stand for medical equipment lock), a gun cabinet (and a gun cabinet lock), a food trolley (and a food trolley lock), a safe or strongbox (and a safe or strongbox lock), and a filing cabinet (and a filing cabinet lock).

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof

The invention claimed is:

1. A toolbox and a lock for securing the toolbox to a support structure, comprising:
- the toolbox comprising a first part, a first attachment, a second part, and a second attachment; and
- the lock comprising:
  - a first lock portion configured to receive the first part of the toolbox or the first attachment of the toolbox; and
  - a second lock portion configured to engage the second part of the toolbox or the second attachment of the toolbox, the second lock portion being lockable to inhibit or substantially prevent disengagement of the second part or second attachment, wherein:
    - the second lock portion is remote from the first lock portion,
    - the first and second lock portions are securable with respect to a support structure, and
    - the first lock portion is configured to guide movement of the second part of the toolbox or the second attachment of the toolbox into engagement with the second lock portion, wherein the second lock portion includes a hook which is configured to engage the second part of the toolbox or second attachment and wherein receipt of the first part or first attachment by the first lock portion allows rotational movement of the toolbox with respect to the first lock portion, to align the second part or second attachment with the hook.

2. The toolbox and lock according to claim 1, wherein the first lock portion comprises a body which defines a channel which is configured to receive the first part of the toolbox or first attachment.

3. The toolbox and lock according to claim 1, wherein the hook is moveable between a stowed and an operative condition.

4. The toolbox and lock according to claim 1, wherein the second lock portion includes a bolt and the hook defines a bolt receiving aperture which is configured to receive at least part of the bolt.

5. The toolbox and lock according to claim 1, wherein the hook is rotatable with respect to a main body of the second lock portion.

6. The toolbox and lock according to claim 5, wherein the hook is further configured for linear movement with respect to the main body.

7. The toolbox and lock according to claim 1, wherein the second lock portion includes a spring biasing arrangement which is configured to bias the hook into an engaging position in which the second part of the toolbox or second attachment is moveable into and/or out of a hook recess.

8. The toolbox and lock according to claim 7, wherein movement of the hook against the spring biasing arrangement moves the hook into a locking position in which the second part of the toolbox or second attachment is inhibited or substantially prevented from leaving the hook recess.

9. The toolbox and lock according to claim 1, wherein the first and second lock portions are securable to the support structure.

10. The toolbox and lock according to claim 1, further including a padlock or integral lock.

11. The toolbox and lock according to claim 1, further comprising a spring biasing arrangement, wherein the hook includes a hook member which defines a recess between an internal edge of the hook member and a body of the hook, wherein:
- the hook recess is configured to receive the second part of the toolbox or second attachment,
- an angled edge of the body of the hook at least partially defines the hook recess,
- the angled edge opposes the hook member across the hook recess,
- the angled edge is angled with respect to a longitudinal axis of the hook such that the second part of the toolbox or second attachment driven against the angled edge will cause the hook to move against a biasing force of the spring biasing arrangement into a locking position, and
- the hook member includes a retaining portion shaped to retain the second part of the toolbox or second attachment when the hook is in the locking position.

12. A toolbox and a lock for securing the toolbox to a support structure, comprising:
- the toolbox comprising a ground engaging mechanism; and
- the lock comprising:
  - a lock portion securable with respect to a support structure; and
  - a lock engagement member, wherein the lock engagement member includes an elongate member which is configured to be mounted to the ground engaging mechanism of the toolbox at a proximal end of the elongate member and the lock portion is configured to engage a free end of the elongate member of the lock engagement member, the lock portion being selectively lockable to inhibit or substantially prevent disengagement of the lock engagement member from the lock portion, wherein the lock engagement member is mounted for rotation about a direction axis with the ground engaging mechanism; and a spring biasing arrangement, wherein:

the lock portion includes a hook with a hook member which defines a recess between an internal edge of the hook member and a body of the hook, the hook recess is configured to receive the lock engagement member, an angled edge of the body of the hook at least partially defines the hook recess, the angled edge opposes the hook member across the hook recess, the angled edge is angled with respect to a longitudinal axis of the hook such that the lock engagement member driven against the angled edge will cause the hook to move against a biasing force of the spring biasing arrangement into a locking position, and the hook member includes a retaining portion shaped to retain the lock engagement member when the hook is in the locking position.

13. The toolbox and lock according to claim 12, further including another lock portion securable with respect to the support structure and configured to receive another part of the toolbox or another attachment of the toolbox.

14. The toolbox and lock according to claim 12, wherein the ground engaging mechanism is a castor which is rotatable about an axle axis and the direction axis, the direction axis and the axle axis being perpendicular to each other.

15. The toolbox and lock according to claim 12, wherein the lock engagement member is mounted to an axle bolt of the ground engaging mechanism.

16. A toolbox and a lock for securing the toolbox to a support structure, comprising:

the toolbox comprising a part and an attachment, and having a lock engagement member mounted thereto; and a lock portion having:

a member which is configured to engage the part of the toolbox or the attachment of the toolbox and which is selectively lockable to inhibit or substantially prevent disengagement of the part or attachment of the toolbox, and a mounting plate to which the member is pivotably mounted and which is configured to be mounted to the support structure, and a spring biasing arrangement, wherein the lock portion includes a hook with a hook member which defines a recess between an internal edge of the hook member and a body of the hook, the member of the lock portion is moveable between an operative condition in which the member extends from the mounting plate a first distance and a stowed condition in which the member extends from the mounting plate a second distance which is less than the first distance, with the mounting plate in a vertical plane, the member extends generally vertically when in the stowed condition and generally horizontally when in the operative condition, the hook recess is configured to receive the lock engagement member mounted to the toolbox, an angled edge of the body of the hook at least partially defines the hook recess, the angled edge opposes the hook member across the hook recess, the angled edge is angled with respect to a longitudinal axis of the hook such that the lock engagement member driven against the angled edge will cause the hook to move against a biasing force of the spring biasing arrangement into a locking position, and the hook member includes a retaining portion shaped to retain the lock engagement member when the hook is in the locking position.

17. The toolbox and lock according to claim 16, wherein the member is a hook which is rotatable with respect to a main body of the lock portion and the main body includes the mounting plate.

18. The toolbox and lock according to claim 17, wherein the member is configured to resist movement from the stowed condition to the operative condition.

19. The toolbox and lock according to claim 18, wherein the member defines an aperture configured to receive a pin, wherein the pin extends through a first part of the aperture when the member is in the operative condition and through a second part of the aperture when the member is in the stowed condition.

* * * * *